(12) United States Patent
Hector, Jr. et al.

(10) Patent No.: US 9,988,317 B2
(45) Date of Patent: Jun. 5, 2018

(54) STRUCTURES CONSTRUCTED USING COAL COMBUSTION MATERIALS

(71) Applicant: Go Team CCR LLC, Raleigh, NC (US)

(72) Inventors: Francis Norbert Hector, Jr., Raleigh, NC (US); Juan Keith Carroll, Littleton, NC (US)

(73) Assignee: Go Team CCR LLC, Raleigh, NC (US)

( * ) Notice: Subject to any disclaimer, the term of this patent is extended or adjusted under 35 U.S.C. 154(b) by 0 days. days.

(21) Appl. No.: 15/710,580

(22) Filed: Sep. 20, 2017

(65) Prior Publication Data

US 2018/0050965 A1 Feb. 22, 2018

Related U.S. Application Data

(63) Continuation-in-part of application No. 15/416,460, filed on Jan. 26, 2017, now Pat. No. 9,790,703.
(Continued)

(51) Int. Cl.
*E04B 1/00* (2006.01)
*C04B 40/00* (2006.01)
(Continued)

(52) U.S. Cl.
CPC ............ *C04B 40/0071* (2013.01); *B28B 3/12* (2013.01); *C04B 18/061* (2013.01);
(Continued)

(58) Field of Classification Search
CPC ...... E04C 2/14; E04C 2/00; E04C 2/06; B32B 19/00; E04B 2/02; E04B 2002/0208;
(Continued)

(56) References Cited

U.S. PATENT DOCUMENTS 866,842 A 9/1907 Comstock
1,198,172 A 9/1916 Wagner
(Continued)

FOREIGN PATENT DOCUMENTS

| | | |
|---|---|---|
| CA | 2123129 | 6/1993 |
| EP | 1655410 B1 | 5/2006 |
| WO | 2010036270 A1 | 4/2010 |

OTHER PUBLICATIONS

Ramme-Thareniyil, We Energies Coal Combustion Products Handbook, 3rd Edition 2013 (448 pgs.)
(Continued)

*Primary Examiner* — Chi Q Nguyen
(74) *Attorney, Agent, or Firm* — Shumaker, Loop & Kendrick, LLP

(57) ABSTRACT

Beneficial use structures are disclosed that include coal combustion residuals ("CCR") mixed with water and a binder to form a structural material and adapted to be compacted for use in the formation of the beneficial use structure. Various structures having beneficial uses described, including survival bunkers, composting pits, mine reclamation encapsulation and carbon sequestration facilities, water storage facilities, compressed air storage facilities, carbon sequestration/mineral carbonation facilities and a pumped hydroelectric facility adapted for use with a lock system of a waterway.

8 Claims, 16 Drawing Sheets

Related U.S. Application Data

(60) Provisional application No. 62/375,581, filed on Aug. 16, 2016.

(51) Int. Cl.
| | | |
|---|---|---|
| *C04B 28/02* | (2006.01) | |
| *C04B 18/08* | (2006.01) | |
| *C04B 18/06* | (2006.01) | |
| *B28B 3/12* | (2006.01) | |
| *C04B 111/00* | (2006.01) | |

(52) U.S. Cl.
CPC .......... *C04B 18/064* (2013.01); *C04B 18/067* (2013.01); *C04B 18/08* (2013.01); *C04B 28/021* (2013.01); *C04B 2111/00051* (2013.01); *C04B 2111/00068* (2013.01); *C04B 2111/00637* (2013.01); *C04B 2111/00724* (2013.01); *C04B 2111/00775* (2013.01)

(58) Field of Classification Search
CPC ....... E04B 2/00; B28B 19/00; B28B 23/0087; B28B 23/0081; E04H 9/10; E04H 9/04; E04H 9/00; F41H 5/0407; C04B 16/08; C04B 40/0028; C04B 16/085; C04B 16/082
USPC ... 52/742.14, 309.9, 309.12, 309.17, 745.19, 52/106, 741.3; 264/36.2, 37.33
See application file for complete search history.

(56) References Cited

U.S. PATENT DOCUMENTS

| | | | |
|---|---|---|---|
| 1,633,132 A | 6/1927 | Schoenhoefer | |
| 1,936,810 A | 11/1933 | Upson | |
| 4,414,001 A | 11/1983 | Kunil | |
| 5,013,349 A | 5/1991 | Tanaka | |
| 5,152,837 A | 10/1992 | Rademaker | |
| 5,227,100 A | 7/1993 | Koslowski et al. | |
| 5,393,794 A | 2/1995 | Sperber | |
| 5,534,058 A * | 7/1996 | Strabala | C04B 28/021 |
| | | | 106/697 |
| 5,541,249 A | 7/1996 | Hughes et al. | |
| 5,974,762 A | 11/1999 | Rodgers | |
| 6,054,074 A | 4/2000 | Wu et al. | |
| 6,084,011 A | 7/2000 | Lucero et al. | |
| 6,272,189 B1 * | 8/2001 | Garin | G01S 19/22 |
| | | | 375/150 |
| 6,277,189 B1 | 8/2001 | Chugh | |
| 6,334,895 B1 | 1/2002 | Bland | |
| 6,716,293 B2 * | 4/2004 | Taymourian | B32B 5/18 |
| | | | 106/405 |
| 6,916,863 B2 | 7/2005 | Hemmings et al. | |
| 6,938,381 B1 * | 9/2005 | Villa | E04L 31/3211 |
| | | | 52/79.1 |
| 6,984,670 B2 | 1/2006 | Meyers, III et al. | |
| 7,117,644 B2 * | 10/2006 | Dehart | E04H 9/10 |
| | | | 52/106 |
| 7,241,818 B2 | 7/2007 | Hemmings et al. | |
| 7,297,720 B2 | 11/2007 | Meyers, III et al. | |
| 7,708,825 B2 | 5/2010 | Sun et al. | |
| 7,727,329 B2 | 6/2010 | Gleeson et al. | |
| 7,842,264 B2 | 11/2010 | Cooper et al. | |
| 7,879,144 B2 | 2/2011 | Hemmings et al. | |
| 7,888,409 B2 | 2/2011 | Hayata et al. | |
| 7,906,028 B2 | 3/2011 | Constantz et al. | |
| 8,001,740 B2 * | 8/2011 | Smith | F41H 5/24 |
| | | | 52/106 |
| 8,025,457 B2 | 9/2011 | Halahml et al. | |
| 8,044,121 B2 | 10/2011 | Mogi et al. | |
| 8,062,418 B2 | 11/2011 | Constantz et al. | |
| 8,104,233 B2 | 1/2012 | Wilsey | |
| 8,114,214 B2 | 2/2012 | Constantz et al. | |
| 8,137,455 B1 | 3/2012 | Constantz et al. | |
| 8,138,234 B2 | 3/2012 | Brown | |
| 8,138,256 B2 | 3/2012 | Soyama et al. | |
| 8,177,909 B2 | 5/2012 | Constantz et al. | |
| 8,206,504 B2 | 6/2012 | Bethani | |
| 8,222,323 B2 | 7/2012 | Xing et al. | |
| 8,299,136 B2 | 10/2012 | Brown | |
| 8,362,113 B2 | 1/2013 | Xing et al. | |
| 8,389,605 B2 | 3/2013 | Xing et al. | |
| 8,603,240 B2 | 12/2013 | Morano et al. | |
| 8,627,612 B2 | 1/2014 | Wilsey | |
| 8,636,941 B1 | 1/2014 | Ciuperca | |
| 8,647,400 B2 | 2/2014 | Dash et al. | |
| 8,672,011 B2 | 3/2014 | Miyazaki | |
| 8,721,785 B2 | 5/2014 | Mohamed et al. | |
| 8,765,841 B2 | 7/2014 | Brien | |
| 8,765,857 B2 | 7/2014 | Fujimaru et al. | |
| 8,802,765 B2 | 8/2014 | Yang et al. | |
| 8,846,776 B2 | 9/2014 | Herrington et al. | |
| 8,857,118 B2 | 10/2014 | Constantz et al. | |
| 8,859,719 B2 | 10/2014 | Mohamed et al. | |
| 8,901,222 B2 | 12/2014 | I et al. | |
| 8,906,156 B2 | 12/2014 | Constantz et al. | |
| 8,927,646 B2 | 1/2015 | Erdem et al. | |
| 8,946,324 B2 | 2/2015 | Hansen | |
| 8,968,688 B2 | 3/2015 | Joshi et al. | |
| 8,969,464 B2 | 3/2015 | LeBlanc | |
| 8,999,014 B2 | 4/2015 | Bai | |
| 9,016,090 B2 | 4/2015 | Hojaji et al. | |
| 9,045,366 B2 | 6/2015 | Brien | |
| 9,115,024 B2 | 8/2015 | Bescher et al. | |
| 9,139,708 B2 | 9/2015 | Brown | |
| 9,162,231 B2 | 10/2015 | Bal | |
| 9,181,663 B2 | 11/2015 | Brien | |
| 9,193,629 B2 | 11/2015 | Hansen | |
| 9,309,161 B2 | 4/2016 | Chen et al. | |
| 9,315,418 B2 | 4/2016 | Brien | |
| 9,481,759 B2 | 11/2016 | Herrington et al. | |
| 9,512,288 B2 | 12/2016 | Brown | |
| 9,550,879 B2 | 1/2017 | Donovan et al. | |
| 9,738,009 B2 | 8/2017 | Lee et al. | |
| 9,752,086 B2 | 9/2017 | Bohlig et al. | |
| 9,758,666 B2 | 9/2017 | Itoh et al. | |
| 9,790,703 B1 * | 10/2017 | Hector, Jr. | E04H 9/04 |
| 2004/0040245 A1 | 3/2004 | Sinclair, Sr. et al. | |
| 2007/0043128 A1 | 2/2007 | Jenkines et al. | |
| 2007/0222106 A1 | 9/2007 | Brown | |
| 2007/0225419 A1 | 9/2007 | Brown | |
| 2007/0265363 A1 | 11/2007 | Huang | |
| 2009/0036573 A1 | 2/2009 | Mita et al. | |
| 2009/0069461 A1 | 3/2009 | Matsui et al. | |
| 2010/0088984 A1 * | 4/2010 | Guevara | E04B 5/043 |
| | | | 52/220.1 |
| 2010/0151226 A9 | 6/2010 | Mashburn et al. | |
| 2010/0286312 A1 | 11/2010 | Zhang et al. | |
| 2011/0061316 A1 * | 3/2011 | Tonyan | B28B 5/027 |
| | | | 52/169.1 |
| 2011/0086932 A1 | 4/2011 | Herrington | |
| 2011/0086933 A1 | 4/2011 | Herrington et al. | |
| 2011/0092617 A1 | 4/2011 | Kensicher | |
| 2011/0132234 A1 | 6/2011 | Constantz et al. | |
| 2012/0029145 A1 | 2/2012 | Brown | |
| 2012/0031027 A1 * | 2/2012 | Burks | E04H 9/14 |
| | | | 52/274 |
| 2012/0046409 A1 | 2/2012 | Plechockl et al. | |
| 2012/0055374 A1 | 3/2012 | Spence et al. | |
| 2012/0136084 A1 | 5/2012 | Brown | |
| 2012/0240503 A1 | 9/2012 | White | |
| 2013/0005858 A1 | 1/2013 | Wada et al. | |
| 2013/0023596 A1 | 1/2013 | Brown | |
| 2013/0075010 A1 | 3/2013 | Miyazaki | |
| 2013/0112409 A1 | 5/2013 | Baleno et al. | |
| 2013/0184365 A1 | 7/2013 | Brown | |
| 2013/0245182 A1 | 9/2013 | Kondo | |
| 2013/0292704 A1 | 11/2013 | Imagawa | |
| 2014/0080942 A1 | 3/2014 | Brien | |
| 2014/0121302 A1 | 5/2014 | Brien | |
| 2015/0000558 A1 | 1/2015 | Ha et al. | |
| 2015/0031799 A1 | 1/2015 | Constantz et al. | |
| 2015/0099409 A1 | 4/2015 | Kim | |

(56) References Cited

U.S. PATENT DOCUMENTS

| | | |
|---|---|---|
| 2015/0128831 A1 | 5/2015 | Hojaji et al. |
| 2015/0152005 A1 | 6/2015 | Leblanc et al. |
| 2015/0267029 A1 | 9/2015 | Hill et al. |
| 2015/0274931 A1 | 10/2015 | Chen et al. |
| 2015/0307401 A1 | 10/2015 | Chen et al. |
| 2015/0353422 A1 | 12/2015 | Fernandez et al. |

OTHER PUBLICATIONS

Thomas, M., 2007. "Optimizing the Use of Fly Ash FN Concrete". FDA, pp. 1-24.

* cited by examiner

STRUCTURES CONSTRUCTED USING COAL COMBUSTION MATERIALS

CROSS-REFERENCE TO RELATED APPLICATIONS AND PRIORITY

This present application claims priority from and incorporates by reference the full contents of a provisional patent application filed on Aug. 16, 2016, Application No. 62/375,581, and U.S. patent application Ser. No. 15/416,460 filed on Jan. 26, 2017, now U.S. Pat. No. 9,790,703 and is a continuation-in-part of U.S. patent application Ser. No. 15/416,460 filed Jan. 26, 2017.

TECHNICAL FIELD AND BACKGROUND OF THE INVENTION

This invention relates to novel uses of a material known as "coal combustion residual" ("CCR"). CCR is finely comminuted particles of material that remain after coal has been burned to provide the immense quantities of heat required to operate high-pressure steam boilers in coal-fired electric power plants operated by electric power utilities such as the Tennessee Valley Authority, Duke Energy and others. CCR accumulates in vast quantities, and storing the material requires expense and creates environmental risk. In recent years, regulatory authorities have taken an increasingly negative view of the manner in which CCR's are stored and have enacted regulations that will require that CCR's be handled in a manner different from past practice.

CCR include fly ash, bottom ash, boiler slag, flue gas desulfurized gypsum (FGD Gypsum) and coal combustion products.

The management of CCR is regulated at both the federal and the state level. The Federal CCR Rule, 80 Fed. Reg. § 21302 (Apr. 17, 2015) and the Direct Final Rule (Oct. 4, 2016), regulate coal ash as a solid waste and not as a hazardous waste. The Rule sets minimum standards for disposal and/or disposition of coal ash. Other state and federal regulations continue to apply to CCR disposal. The Federal CCR Rule includes detailed standards for the design and location of CCR landfills and impoundments, groundwater monitoring, remediation, structural integrity and final closure of landfills and impoundments.

The Federal CCR Rule does not regulate practices that meet the definition of a "beneficial" use of CCR, which must meet all of the following conditions, as found in 80 Fed. Reg. at § 21349:
(1) the CCR must provide a functional benefit;
(2) the CCR must substitute for the use of a virgin material, conserving natural resources that would otherwise need to be obtained through practices such as extraction;
(3) the use of CCR must meet relevant product specifications, regulatory standards or design standards when available and when such standards are not available, CCR are not used in excess quantities; and
(4) when un-encapsulated use of CCR involves placement on the land of 12,400 tons or more in non-roadway applications, the user must demonstrate and keep records and provide such documentation upon request, that environmental releases to groundwater, surface water, soil and air are comparable to or lower than those from analogous products made without CCR, or that environmental releases to groundwater, surface water, soil and air will be at or below relevant regulatory and health-based benchmarks for human and ecological receptors during use. EPA's final CCR management rule (https://www.regulations.gov/doucment?D=EPA-HQ-RCRA-2009-0640-11970), and EPA's direct final CCR management rule https://www.epa.gov/coalash/coal-ash-rule. Worldwide web links are provided for easy reference.

Any use that fails to comply with each of the above criteria is considered "disposal" of CCR and is subject to all disposal requirements in the Federal CCR Rule.

More specifically, the present invention relates to utilization and construction of containment structures and mine reclamation projects using specialty design mixes made from encapsulated CCRs and other industrial byproduct materials. The mix designs described in this application have application in load bearing, improved/encapsulation, roller-compacted concrete (RCC) and the carbon capture flowable fill materials. All of the mix designs have been developed so that the US EPA guidelines for beneficial use of industrial non-hazardous materials are achieved or exceeded. In addition, to mix designs that safely and effectively contain potential contaminants in CCRs and other industrial byproduct materials, this invention provides guidelines for ensuring beneficial use through encapsulation and mitigation of the leaching potential of harmful contaminants. This is accomplished by following the Final CCR Rule, Apr. 17, 2015, and the US EPA Methodology for Evaluating Beneficial Uses of Industrial Non-Hazardous Secondary Materials, April 2016 [2, 3] and applicable standard guides from American Society of Test Materials E-50 Committee. This invention achieves the four criteria for beneficial use as defined by the US EPA: (1) The CCR must provide a functional benefit; (2) The CCR must substitute for the use of a virgin material, conserving natural resources that would otherwise need to be obtained through practices such as extraction; (3) the use of CCR must meet relevant product specifications, regulatory standards or design standards when available, and when such standards are not available, CCR is not used in excess quantities; and (4) the proposed application is an encapsulated use of CCR as defined by the US EPA Final CCR Rule.

In order to achieve suitable encapsulation of CCRs and other deleterious materials, the mix design and applications for this invention follows the required US EPA requirements. Specifically encapsulated beneficial uses are those where the material is bound in a solid matrix that minimizes mobilization of heavy metals and other deleterious constituents into the surrounding environment. Examples of encapsulated uses include, but are not limited to: aggregate in concrete; a replacement for or raw material used in production of, cementitious components in concrete or bricks; filler in plastics, rubber and similar products; and raw material in the manufacture of a product such as wallboard.

One of the key aspects of this invention is the practical application of US EPA methodologies for verifying protection of the environment and the required characteristics to qualify as a beneficial use as defined by the US EPA Final CCR Rule. Following this Rule, will pre-qualify or pre-screen the uses identified in this patent by identifying the limiting factors that would influence the scoping, siting and impact analysis for the CCR material or site under consideration. This is accomplished by pre-testing (i.e. using the LEAF test methods of SW-846) the CCR material so that the leaching characteristics are controlled or mitigated. This pre-project testing and evaluation for this invention is expected to include:
(1) verification that deleterious substances and/or metals in the materials are bound in a solid material or solid-like material;

(2) site-specific scoping and site selection is appropriate from the US EPA impact analysis perspective, and (3) offering guidelines for site characterization that are consistent with approved US EPA methodologies such that mobilization of deleterious constituents to the surrounding environment is controlled and/or eliminated.

Since mortar materials used in load bearing walls, RCC dams and mine reclamation projects can require the use of aggregates to obtain sufficient strength, this invention includes and incorporates the use of fine sand and coarse aggregates developed from CCR, and other industrial byproducts, or commercially available aggregates. The invention includes offering design guidelines and installation methods so that the aggregates, products and containment structures are considered encapsulated products either by pre-testing or by following US EPA methodologies. This method includes developing mix designs that achieve the three primary characteristics of strength, durability, and reduced permeability and leaching potential.

The design features for this invention are unique because they will be tested and applied not only for resistance to weathering and providing adequate strength, but also for protection of the environment. This application of the principle of durability is outlined in documents provided by the US EPA on the use and application of the LEAF protocol for site assessment, evaluation of materials and design. In addition to strength, the materials in the mix designs for this invention will minimize or prevent the leaching and migration of deleterious constituents from the CCRs and/or industrial byproduct materials into the surrounding environment.

The invention recognizes that pre-existing patents may exist for lightweight aggregates and other application of CCR materials in the fields of road, dam and building construction. The disclosure of this application provides an integrated approach that utilizes existing technology and industry-recognized methods in novel ways for improving concrete material to maximize the beneficial use of CCR and other industrial byproduct materials while providing an innovative approach for the use of CCR materials.

Each year in the United States over one hundred million tons of coal combustion ash is generated and must be used or disposed of in some manner. Approximately half of the ash is now disposed of by on-site landfilling. However, some small part of the ash is used as a component in building materials mainly cast-in-place concrete or concrete pavement roadways. (See American Coal Ash Association (ACAA) Coal Combustion Product (CCP) Production & Use Survey Report, 2013 and 2015)

Other potential uses for fly ash and other CCRs have been surveyed by the ACAA and include structural fills, roadway embankments, mine reclamation, underground mine backfilling, and as a cement replacement—concrete, agriculture uses, and many others. The physical and chemical composition and characteristics of coal combustion fly and other CCRs can vary depending upon the type of coal that is burned and the type of combustion equipment and the conditions of combustion. The most common types of coal ash are class F fly-ash (ASTM C-618-15, Class F; finely divided residue produced from burning anthracite or bituminous coal); fluidized bed combustion (FBC) ash (produced from burning coal with limestone in a fluidized bed combustion furnace); and class C fly ash ASTM Designation No. C618-15, a finely divided residue produced from burning lignite or sub-bituminous coal and having a lime content that is typically higher than 10%). More complete descriptions of the types, properties and composition of various types of coal combustion ash have been provided in, for example, Material and Research Society Proceedings, Volumes 43, 113, 136 and 178.

One use of CCR disclosed in this application is for load-bearing walls, and walls made from mortar mixes with a high CCR content. Load-bearing walls and concrete members are proposed utilizing general guidelines established in technical articles by Ohio State University, the US Bureau of Reclamation for RCC Dams, and the National Precast Concrete Association. Elevated percentages of coal fly ash as a cement replacement is known to increase the workability, decrease the water/cement ratio, and increase durability of the concrete mix (Coal Combustion Products Utilization Handbook, WE Energies, 2013). Typical percentages of Type F or Type C coal fly ash as a portion of the cement range from 15 to 30 percent for moderate replacement and 30 to 50 percent for high replacement in precast structures. For cast in place load bearing walls, the CCR or fly ash replacement percentage can be increased to 50 to 70 percent depending on the requirements for early strength of the concrete or mortar mix and the need to control cracking caused by hydration of the Cementous materials.

The compressive strength of the different mix designs utilizing fly ash range from 3,000 to 4,000 psi for load bearing walls depending on the percentages of aggregate, fly ash, water and cement that are used. As disclosed in this application, the percentage of CCR content for load bearing walls would be dependent on the thickness of the load bearing wall, the surcharge load applied to the wall and the width and length of the bearing surface of pre-cast concrete members. Some embedment of steel and/or a special keyway locking structure may be required depending on the lateral forces developed from the geotechnical global slope stability evaluation. These products and methods relating to load bearing structures will require verification that the mix design, structural design, and site-specific application will be required to meet the three primary performance criteria of strength, durability and reduction in permeability/leaching potential.

Another proposed use of CCR's as disclosed allows the use of CCRs as the main component RCC dams for containment of compacted CCRs and/or as the buttress for a large CCR structural fill project.

The United States Bureau of Reclamation (USBR) Manual entitled "Roller-Compacted Concrete Design and Construction Considerations for Hydraulic Structures, 2005" indicates an acceptable percentage of coal fly ash and other CCRs for this type of application as high as 50 to 70 percent. The elevated percentage of CCRs as compared to Portland cement is possible because the CCRs serve as both a cement material replacement and a fine aggregate material. A higher percentage of fly ash can result in reduced strength. Accordingly, a limiting factor may be the load bearing capabilities of the CCR and RCC structure when evaluated using conventional geotechnical design and slope stability evaluation methods.

When this invention or method is used as an RCC containment wall that supports water and/or a surcharge load of fly ash or backfill material, a complete geotechnical investigation including and foundation design and global slope stability analysis will need to be conducted so that the RCC design and site-specific-application will meet the three primary performance criteria of strength, durability and reduction in permeability/leaching potential.

A third application according to the disclosure of this application includes the use of encapsulated CCRs in a specialty mix design that can function as the aggregate and Cementous component for the construction of a stable mine reclamation material. The use of CCRs in mine reclamation has been well documented in design guidelines and numerous case studies by State agencies and the US Office of Surface Mining Reclamation and Enforcement (OSMRE). This method will address many of the concerns and consideration in previous OSMRE documents by pre-testing and pre-design to verify strength, durability and reduction in permeability and leaching potential of deleterious constituents from CCRs.

The dual purpose of the encapsulated flowable fill material made of CCRs with a predetermined percentage of cement and/or lime and specialty additives enables the material to be used to:
(1) reclaim mine with a mix that provides adequate strength to support unstable areas;
(2) provide a balanced mix that has suitable flow characteristics for top down or injection installation to bridge unstable areas of the mine while maintaining sufficient durability to reduce the potential for acid mine drainage;
(3) has a low enough permeability to provide reduced leaching potential and to contain deleterious constituents in the solidified, encapsulated mix, and
(4) if required to provide a sufficient open-graded or air entrained cementitious material that is a stable matrix for carbon capture.

Typical percentages of coal fly ash and other CCRs for the mine reclamation application would range from 70 to 90 percent depending on the pozzolanic activity of the coal fly ash and design requirement for the mine reclamation. When a method according to this disclosure is used for above ground or below ground mine reclamation, the mix design and site-specific methods will be required to address applicable State mine reclamation guidelines and the requirements of the Surface Mining Control And Reclamation Act of 1977.

The novel approach of this invention is to create contaminant structures to create a renewable energy storage area while providing remediation of an industrial material that is required to meet strict regulatory requirements.

The mix designs for the three uses outlined above involve high replacement percentages of cement with CCRs, and a reduction in the amount of water required by increasing the percentage of coal fly ash and other CCRs that are utilized. The use of coal fly ash in concrete and mortar mix designs is an established and effective approach that is been well understood for many years and documented in numerous industry papers. Recent developments using very high percentages of coal fly ash and other CCRs in concrete and mortar mix design have indicated that strength is increased and workability is improved with increasing amounts of coal fly ash to reduce the required amount of manufactured Portland cement. The amount of coal fly ash used in a mix design is dependent on the strength and workability requirements that must be tested on a project and site-specific basis.

Containing and/or encapsulating heavy metals and other deleterious constituents in structures or materials a component of the novel approach of this invention is recommended by the US EPA when structures with high percentages CCRs or coal fly ash are applied in the natural environment. The leaching potential of heavy metals from concrete and/or Cementous structures are best measured by performing a series of leaching potential tests according to the Leaching Environmental Assessment Framework (LEAF) developed by Vanderbilt University for the US EPA. For purposes of this invention, the concrete or mortar mix designs will be developed to provide adequate containment as determined by an acceptable reduction in the leaching potential of heavy metals as determined by the LEAF protocol and applicable sections of US EPA SW-846.

For development of this invention and its application in loading bearing walls or structures, the following mix design parameters are provided using the design principles from the US Bureau of Reclamation, Ohio State University. The mix designs for this invention are unique because they achieve a balance of the three primary characteristics of strength, durability and reduced permeability/leaching potential.

The use of coal fly ash and other CCRs in the concrete mix is designed achieve strength, workability, durability, reduction in permeability and containment of CCRs to provide an energy storage system. The United States Bureau of Reclamation (USBR) has developed guidelines for the use of coal fly ash in RCC dams and the process for optimizing the percentage of coal fly ash in RCC mix designs. Notable case studies by the USBR at the Upper Stillwater Dam, in 1987 indicated high durability, low permeability RCC mix design using fly ash to cement replacement percentage as high as 68 percent. The USBR Manual Roller Compacted Concrete Design and Construction Considerations for Hydraulic Structures provides guidelines for developing RCC mix proportions that optimize the use of coal fly and performance of the structures based on:
(a) compressive strength and elastic properties,
(b) cement plus pozzolan content and cement to pozzolan ratio,
(c) thermal properties; and
(d) durability.

With regard to the use of RCC dam mix designs for this invention, the novel approach includes optimizing the mix design to provide containment, encapsulation and prevention of leaching of heavy metals and other deleterious constituents to the natural environment. For the RCC dam mix design used by this invention, determining the durability and leaching potential of the aggregate used in the RCC dam containment structure will also be required. This will be accomplished by testing hardened specimens of the RCC mix for leaching potential and raising or lowering the amount of coal fly ash and cement content to achieve a mix that has the required compressive strength and reduction in the leaching potential of heavy metals and other deleterious constituents to the natural environment. The RCC mix design for this invention is unique because it achieves a balance of the three primary characteristics of strength, durability and reduced permeability/leaching potential.

Because the quality of the fly ash can vary depending location and method of combustion, the strength, durability and reduced permeability of the mix designs will be verified by testing prior to final design or application. Since the construction of RCC dam structures for containment of water and CCR requires development and use of quality control procedures in the field, application of the novel features of this disclosure will also include development and use of mix designs that utilize hydrophobic chemicals such as organosilanes and other permeability reducing additives. The use and optimization of these materials and additives for controlling leaching potential from CCRs and coal fly ash materials used in structural fills and mine reclamation has been established by previous research. "Preserving Structural Fill and Mine Reclamation as Acceptable Beneficial Reuse of CCRs", Hardin and Daniels, 2011. Recognizing that the Cementous qualities of coal fly ash and other CCRs vary, will require that project specific RCC mix designs be developed for optimize strength and ensure adequate containment of heavy metals and other deleterious constituents. The following tables from USBR literature are incorporated as part of the technical basis for RCC dam mix designs for this invention. It is recognized that additional testing will be required to provide the combination of strength, durability and reduction in leaching potential that is one of the novel components of this invention.

The State of Pennsylvania from 1970 to 2000 implemented several innovative mine reclamation projects that utilized a wide variety of coal ash and other industrial byproducts. Since 1982, the Pennsylvania Department of Environmental Protection (PADEP) has administered an extensive coal mine reclamation plan that has provided guidelines for mine stabilization using fly ash stabilized with cement, lime and a variety of industrial byproduct materials. Many of these guidelines are available through the U.S. Office of Surface Mining Reclamation and Enforcement (OSMRE). The focus of many of these guidelines is to safely stabilize a coal mine with flowable mix designs that can be placed from the surface.

This invention provides a coordinated use of the mine reclamation mix designs available from the OSMRE in conjunction with improvement measures that create some porosity, while maintaining adequate long-term stability and encapsulation. This is accomplished by utilizing chemical additives that work with the inherent properties of coal fly ash, while maintaining the Cementous and pozzolanic properties of cement. This invention will require testing and validation of mine reclamation stabilization (OSMRE methods), carbon absorption potential (CREAT system, patented by Dr. S. Chen in China), and the encapsulation as measured by the US EPA Leachability Environmental Assessment Framework (LEAF) protocol. The test methods developed as part of the CREAT system are already being used effectively in other parts of the world, and this invention will allow application of these methods for carbon capture utilizing large volumes of CCRs in a manner that meets the requirements of the US EPA. The mix design for this invention is unique because it achieves a balance of the three primary characteristics of strength, durability and reduced permeability/leaching potential.

The properties necessary to cost-effectively stabilize coal mines, absorb CO2 and encapsulated metals are all enhanced by a mix of fly ash, lime and/or cement. The percentages of each additive depend on the unique properties of the coal fly ash and the site-specific characteristics present at the mine that is reclaimed. This invention utilizes existing technologies with an optimized or specially designed mix of fly and cement to create the required performance. The US EPA Methodology for Evaluating Beneficial Uses of Industrial Non-Hazardous Secondary Materials, April 2016, provides a framework for applying these technologies in a manner that enhances environmental protection and ensures beneficial use of industrial byproduct materials.

SUMMARY OF THE INVENTION

It is therefore one object of the invention to provide a means by which CCR can be used in beneficial ways to create structures that would otherwise use other, more expensive or non-renewable resources.

It is another object of the invention to provide structures that permit beneficial movement of CCR from disposal sites to locations where beneficial use of the CCR can be made.

These and other aspects of the invention are achieved by providing a beneficial use structure that includes coal combustion residuals ("CCR") mixed with water and a binder to form a structural material, and adapted to be compacted for use in the formation of the beneficial use structure.

According to one embodiment of the invention, the structural material is adapted for use as a load-bearing wall, and is comprised of between approximately 50 25 and 50 percent CCR, 25 and 50 percent water and 25 and 14 percent cement.

According to another embodiment of the invention, the structural material is adapted for use as a roller-compacted cement/CCR mixture, and includes between approximately 50 and 75 percent CCR, 25 and 50 percent cement and a minor percent of additives.

According to another embodiment of the invention, the structural material is adapted for use for mine reclamation encapsulation and carbon sequestration and includes between approximately 50 and 63 percent CCR, 22 and 9 percent cement and 21 and 37 percent water.

According to another embodiment of the invention, the beneficial use structure is a survival bunker, and includes an interior volume defined by sloped sidewalls and a planar top that together define a truncated pyramid structure, and having blast-deflecting characteristics defined by a solid volume thickness of the sloped sidewalls and planar top. The solid volume thickness of the bunker is constructed of a coal combustion residue ("CCR")-based material. A base is provided on which the sloped sidewalls and planar top are constructed, and a plurality of survival living areas in the interior volume of the bunker are provided on the base and reached by respective entrance/exit tunnels formed through the CCR-based material. Air intake and exhaust plenums extend between the survival living areas and outside the bunker to maintain appropriate oxygen levels in the bunker, and at least one multi-fuel generator is provided for providing electric current to the survival living areas, including at least one fuel supply facility for supplying fuel to the generator.

According to another embodiment of the invention, a water storage stepwell is provided and is defined by a vertical shaft within an area of the bunker and adapted to accumulate water from any source for use by bunker occupants. The planar top of the bunker is sloped towards the stepwell to promote drainage of water accumulating on the top of the bunker. The stepwell includes an array of narrow steps along one side of the stepwell that permit entry into the stepwell and allow access to the entire stepwell.

According to another embodiment of the invention, the stepwell includes a drain at a bottom of the stepwell that is adapted to deliver water under gravitational pressure a generator to generate electricity.

According to another embodiment of the invention, the beneficial use structure is a compost pit, and includes an interior volume defining a solid volume thickness of the composting pit constructed of CCR-based material. A predetermined number of compost pits are embedded within the interior volume, each having a top opening, solid sidewalls and a bottom, and sized to receive a predetermined quantity of compostable material. Each compost pit has at least one drain in the bottom that connect to drain conduits that permit controlled drainage as required to maintain proper moisture and temperature of the material being composted. At least one air pump is provided and is adapted to force air under pressure into the compost pits through an air conduit.

According to another embodiment of the invention, a ramp constructed of CCR is provided for allowing access by containers to the compost pits from a position below the top opening.

According to another embodiment of the invention, the CCR is a material selected from the group of materials consisting of roller compacted CCR, poured-in-place concrete or a composite of roller compacted CCR and concrete.

According to another embodiment of the invention, the beneficial use structure is a pumped water storage reservoir that includes a base constructed of compacted CCR to increase the height of the storage facility to a predetermined amount above surrounding terrain and thereby provide for greater stored potential hydro energy. A water storage impoundment is constructed on the base from a material selected from the group of materials consisting of at least one layer of roller-compacted concrete or strengthened CCR. Drains are positioned in a bottom of the impoundment and conduits are connected for water flow from the drains. At least one hydroelectric pump/generator is connected to the conduits for receiving water outflow from the impoundment to generate electricity for use during peak use periods to supplement electricity generated by conventional electric utility generators and in low utilization periods to pump water into the impoundment through the drains.

According to another embodiment of the invention, the beneficial use structure is a compressed air energy storage facility that includes a housing constructed of CCR and a mixture of binding materials that bind the CCR into a stable, airtight matrix. A plurality of storage containers are provided for receiving and storing a gas in a compressed state. At least one compressor is provided for compressing the gas and to delivering the gas to the horizontal and vertical storage containers through feed pipes.

According to another embodiment of the invention, the beneficial use structure is a carbon sequestration/mineral carbonation facility that includes a containment enclosure including a base having tapered walls constructed of strengthened CCR in a mixture with materials that fill interstices between the CCR particles with material that is stable and does not permit leakage of sequestered material from the facility. A plurality of sequestration beds are positioned within the enclosure, and a two stage filter section is provided that includes a first stage with a relatively coarse filtration material and a second filter section with a relatively fine filtration material adapted to provide a progressive filtration effect across a large surface area to remove particulates and gas components of pressurized coal plant emissions that are injected into the containment enclosure through supply conduits. Vents communicate with the sequestration beds to allow filtered gases to be vented from the sequestration beds.

According to another embodiment of the invention, the beneficial use structure is a pumped hydroelectric facility adapted for use with a lock system of a waterway and includes a base constructed of compacted CCR and positioned on a terrain for increasing the elevation of the hydroelectric facility about the lock system of the waterway. A water impoundment having raised walls constructed of a material is provided and selected from the group consisting of compacted concrete and compacted low leaching and low permeability strengthened CCR. A lock filling piping system is provided that interconnects the water impoundment with the lock system of the waterway for increasing the fill rate of the lock system to permit an increased rate of transit of vessels through the lock system. Intake pipes are positioned upstream of the lock system for receiving water from the waterway, and a hydroelectric generator/pump facility is provided for receiving water from the intake pipes and generating electricity from movement of the water from the intakes pipes through the hydroelectric generator/pump facility.

According to another embodiment of the invention, the hydroelectric generator/pump facility is connected to impoundment fill piping for receiving water from the waterway and pumping the water into the impoundment for storage and use for increasing the fill rate of the lock system.

BRIEF DESCRIPTION OF THE DRAWINGS

FIG. 10A is a fragmentary vertical cross-section showing details of the sequestration bed of the invention;

DETAILED DESCRIPTION OF PREFERRED EMBODIMENTS

Figure 1:
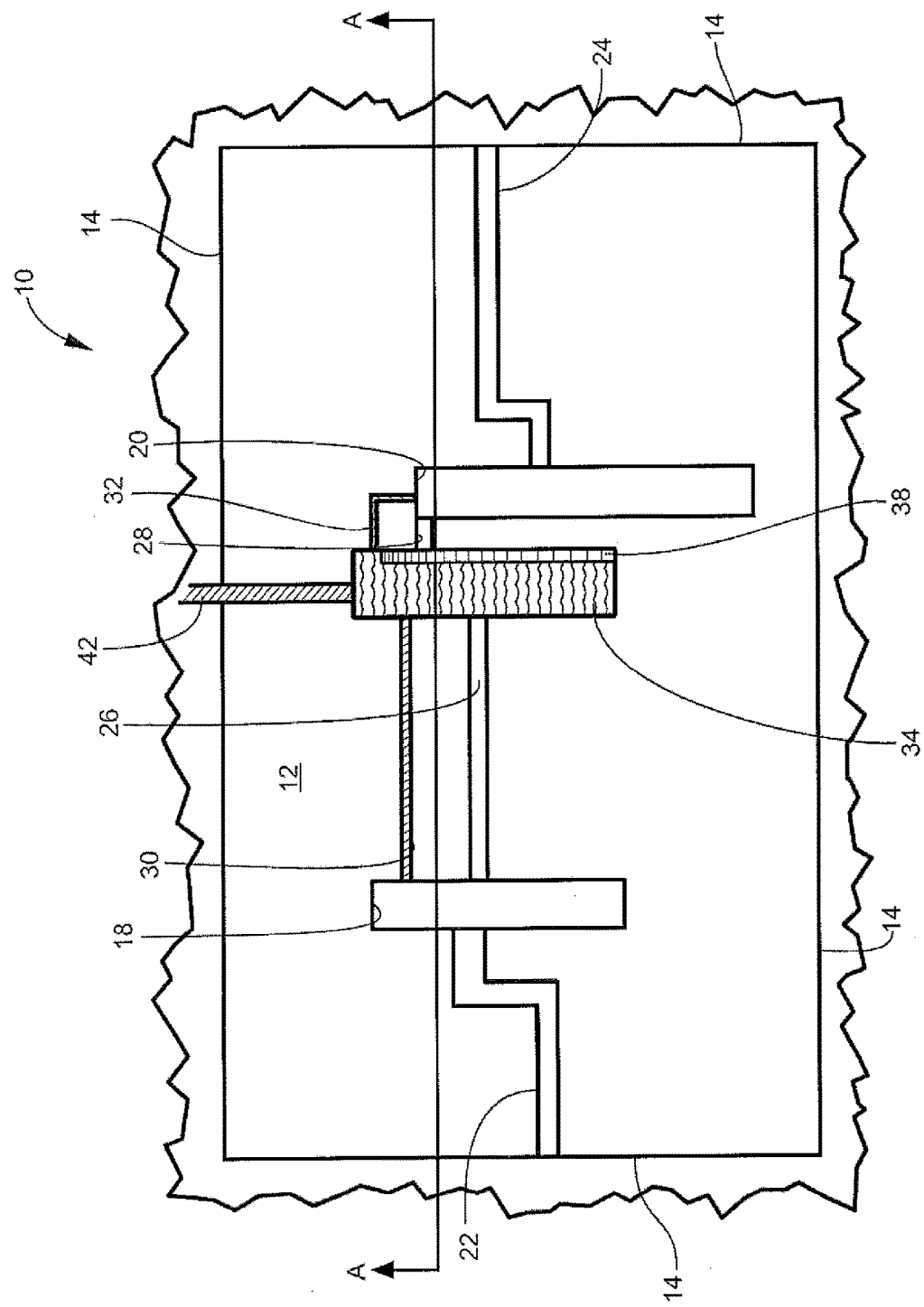
FIG. 1 is a plan view of a survival bunker with stepwell according to an embodiment of the present invention.
Figure 2:
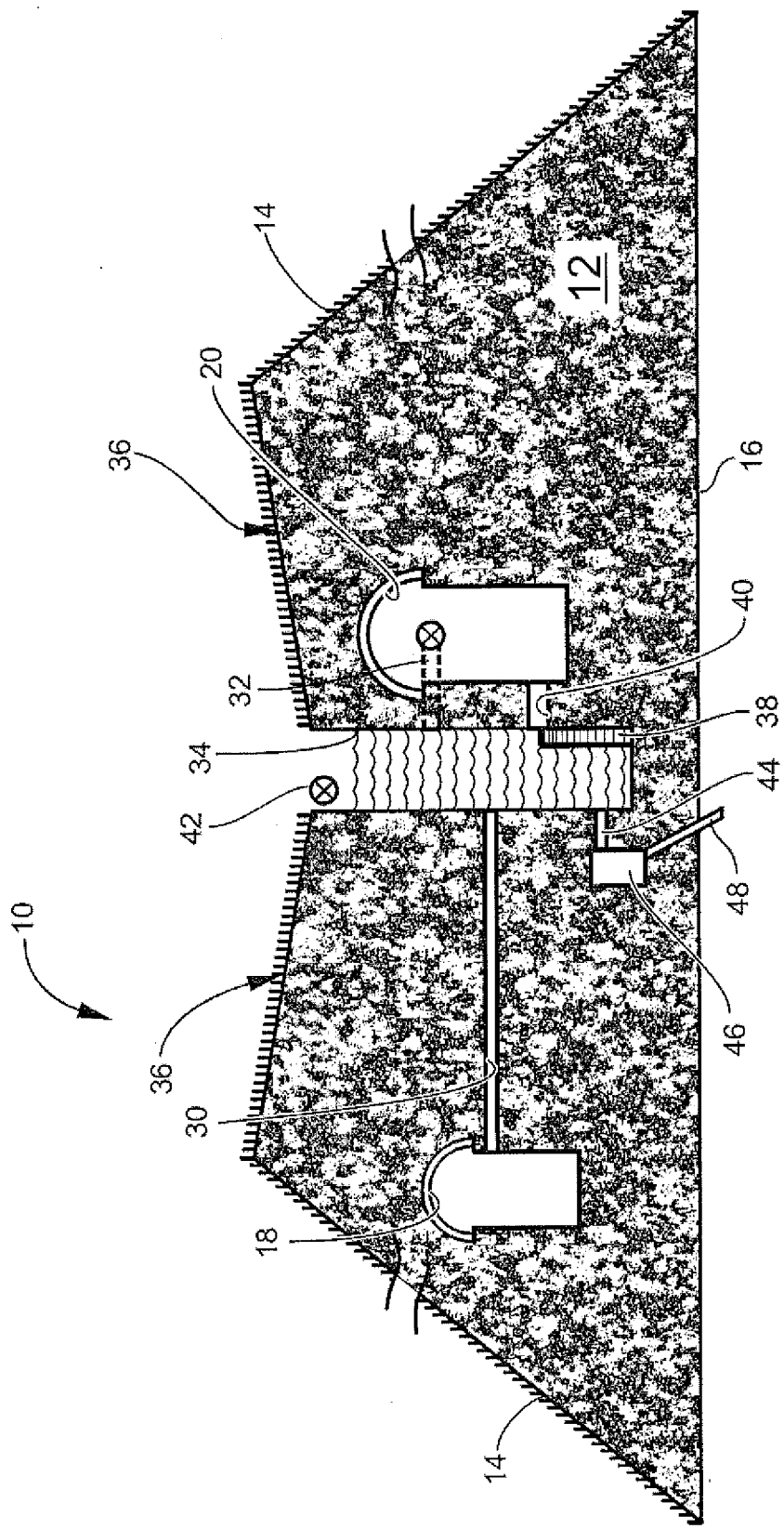
FIG. 2 is a side elevation section of the survival bunker with stepwell taken along section lines A-A of FIG. 1.

Referring now to the drawings, a survival bunker 10 with stepwell according to one preferred embodiment of the invention is illustrated in FIGS. 1 and 2. This embodiment is only an example of a wide variety of structures that can be fabricated using the techniques disclosed in this application, and is not drawn to scale. Bunker 10 includes an interior volume 12 defined by sloped sidewalls 14 and a planar top 36 that together define a truncated pyramid structure, which may or may not include inherent blast-deflecting characteristics.

The solid volume of the bunker 10 is formed of CCR-based materials according to the examples provided in this application. The bunker 10 is supported on a base 16, which will typically comprise the existing ground. The bunker 10 includes survival condominiums 18 and 20, which are comprised of a predetermined number of living areas. The condominiums 18 and 20 are reached by respective entrance/exit tunnels 22, 24 formed through the CCR material. Exits 26, 28 provide alternative emergency exits from the condominiums 18 and 20 if one or both of the entrance/exit tunnels 22, 24 are blocked or otherwise unavailable.

Primary air intake and exhaust plenums 30, 32 maintain appropriate oxygen levels in the bunker 10 and vent carbon dioxide, combustion gases and other air contaminants. Fuel storage tanks 22 and 34 provide fuel to the enclosure 10 to operate all fuel-consuming equipment and are capable of storing and feeding multiple types of fuel, as required. The bunker 10 includes multi-fuel generators for providing electric current to all electrical equipment. In addition, external electric current can be supplied by suitable conduits and transmission equipment exterior to the bunker 10.

The bunker 10 includes a water storage stepwell 34 that can be used to accumulate water from any source for use by the bunker occupants. The top surface 36 of the bunker 10 is sloped towards the stepwell 34 to promote drainage of water accumulating on the top surface 36 of the bunker 10. The stepwell 34 includes a vertical shaft from which water is drawn and the surrounding inclined subterranean passageways, chambers and steps, which provide access to the stepwell 34. Stepwells are known from antiquity in other contexts and are typically formed by a zig-zag array of narrow steps 38 along one side of the stepwell 34 that permit entry into the stepwell 34 and allow access to the entire stepwell 34 without the use of ladders or conventional, wide stair steps. See https://en.wikipedia.org/wild/Stepwell#Details.

The stepwell 34 may include a waterproof entrance/exit 40 from the condominium 20 into the stepwell 34. The stepwell 34 includes an overflow drain 42. In addition, the stepwell 34 may be used to generate electricity by allowing water to flow out of the bottom of the stepwell 34 through an outflow conduit 44 into a turbine generator 46 which generates electricity and then exits the generator 46 through a generator drain 48.

Preferably, the bunker 10 is covered by an overburden of either soil or a synthetic material, which may have a camouflage appearance. The overall shape of the bunker 10 maybe contoured to correspond to surrounding topographical features. Of coarse, dimensions of the bunker 10 are variable within a wide range. The CCR constituents and relevant strength and density values for the load-bearing structures of FIGS. 1 and 2 are found in Table 1 of this application.

Figure 3:
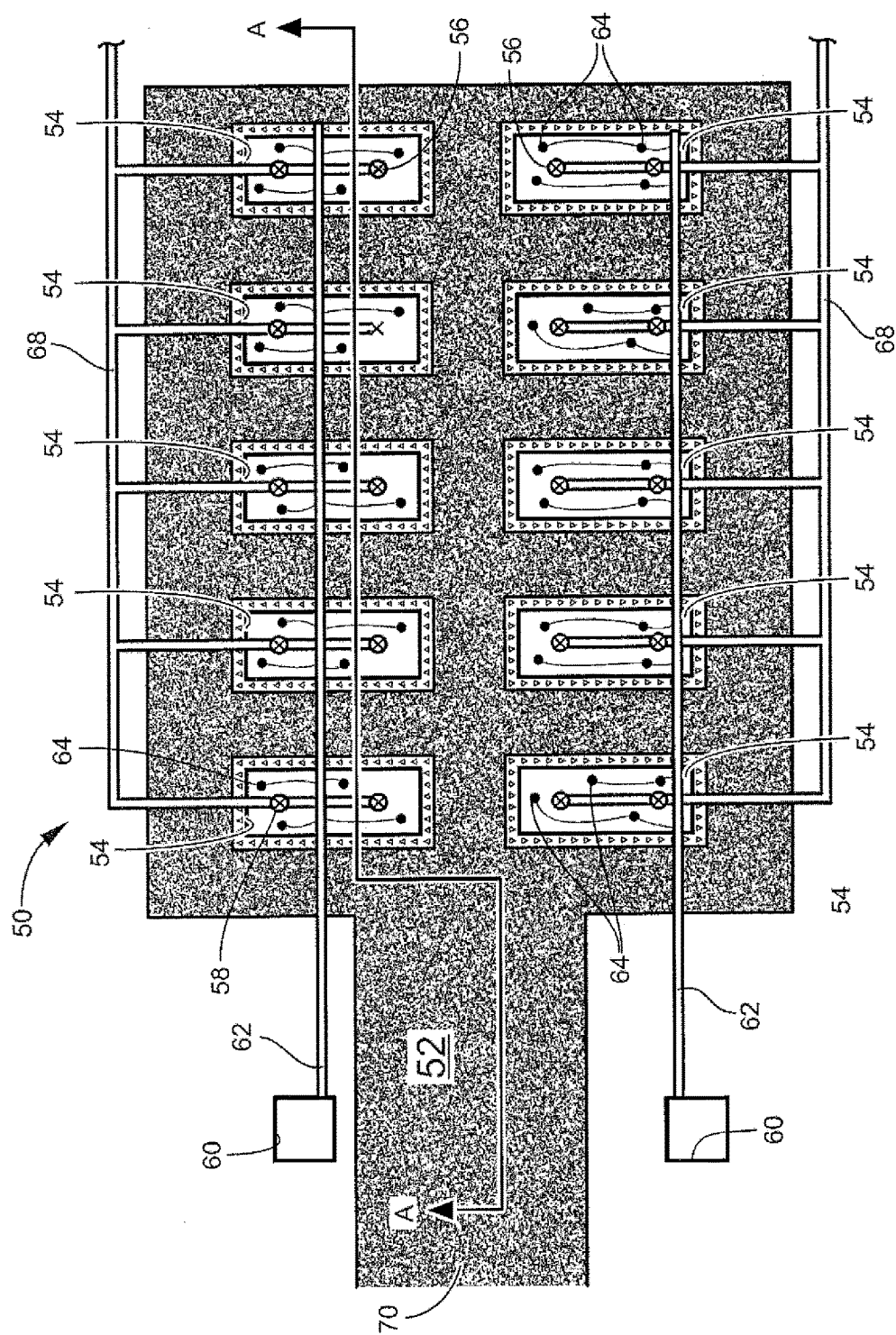
FIG. 3 is a plan view of a composting field constructed according to an embodiment of the invention.
Figure 4:
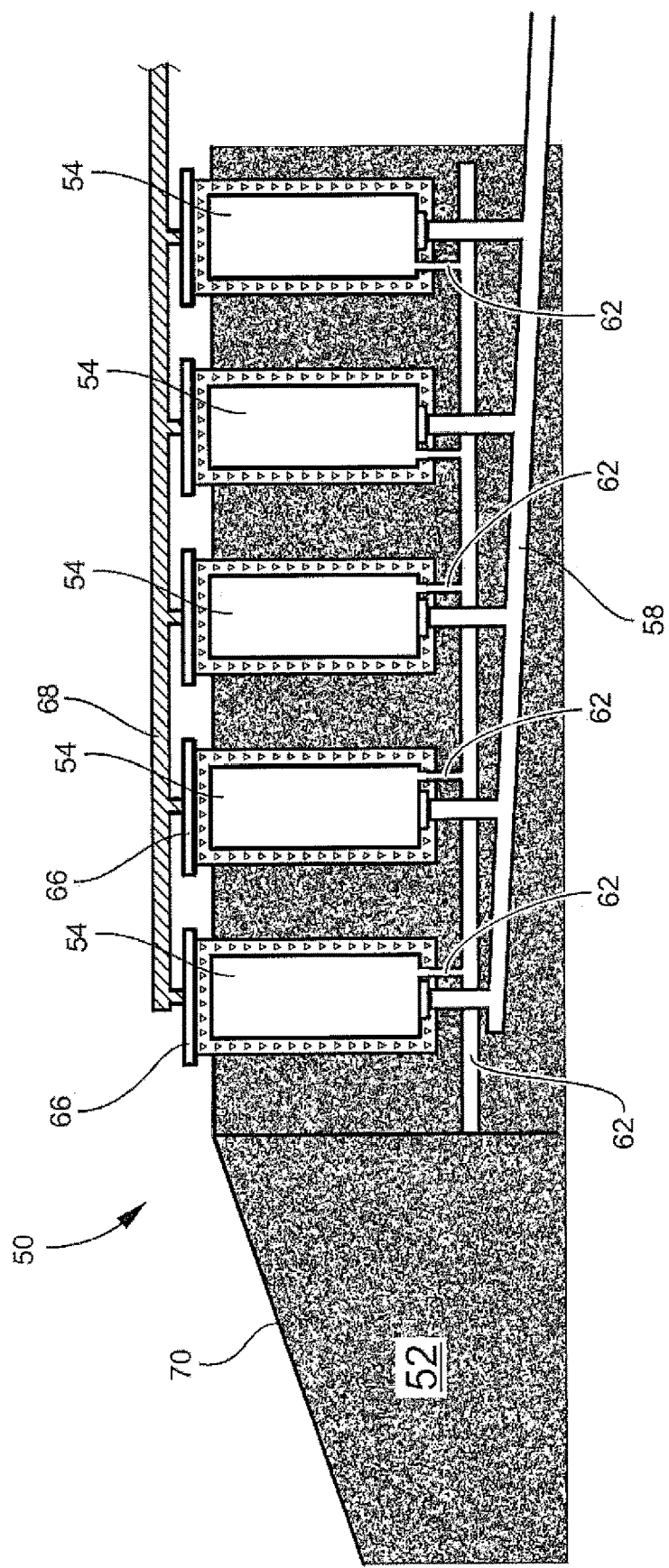
FIG. 4 is a side elevation section of the composting field taken along section lines A-A of FIG. 3.

Referring now to FIGS. 3 and 4, a composting field 50 constructed of strengthened CCR material 52 is shown. The CCR material 52 forms a volume within which are embedded a predetermined number of compost pits 54, which may be constructed of roller compacted CCR, poured-in-place concrete or a composite of roller compacted CCR and concrete. The compositing pits have solid sidewalls and bottom and are sized to receive a predetermined quantity of compostable material, which may be any suitable organic material that can be biodegraded. The size scale is widely variable.

Each compost pit 54 has one or more drains 56 in the bottom that connect to drain conduits 58 that are controlled by valves (not shown) that permit controlled drainage as required to maintain proper moisture and temperature of the material being composted. Air pumps 60 force air under pressure to the compost pits through air conduits 62 that force air under pressure into the bottom of the compost pits 54 through vents 64 and convey the air to suitable biofilters. Preferably, the compost pits 54 are covered by respective airtight removable tops 66. See FIG. 4. Air passes through the compost pits 54 from the conduits 62 and exit the compost pits 54 though vents 68.

The compost pits 54 are accessed, for example, by a ramp 70, FIG. 4, by which refuse-laden containers are moved into position to deposit material into the compost pits 54, and to remove composted material. The CCR constituents and relevant strength and density values for the load-bearing composting field 50 of FIGS. 3 and 4 are found in Table 1 of this application.

Figure 5:
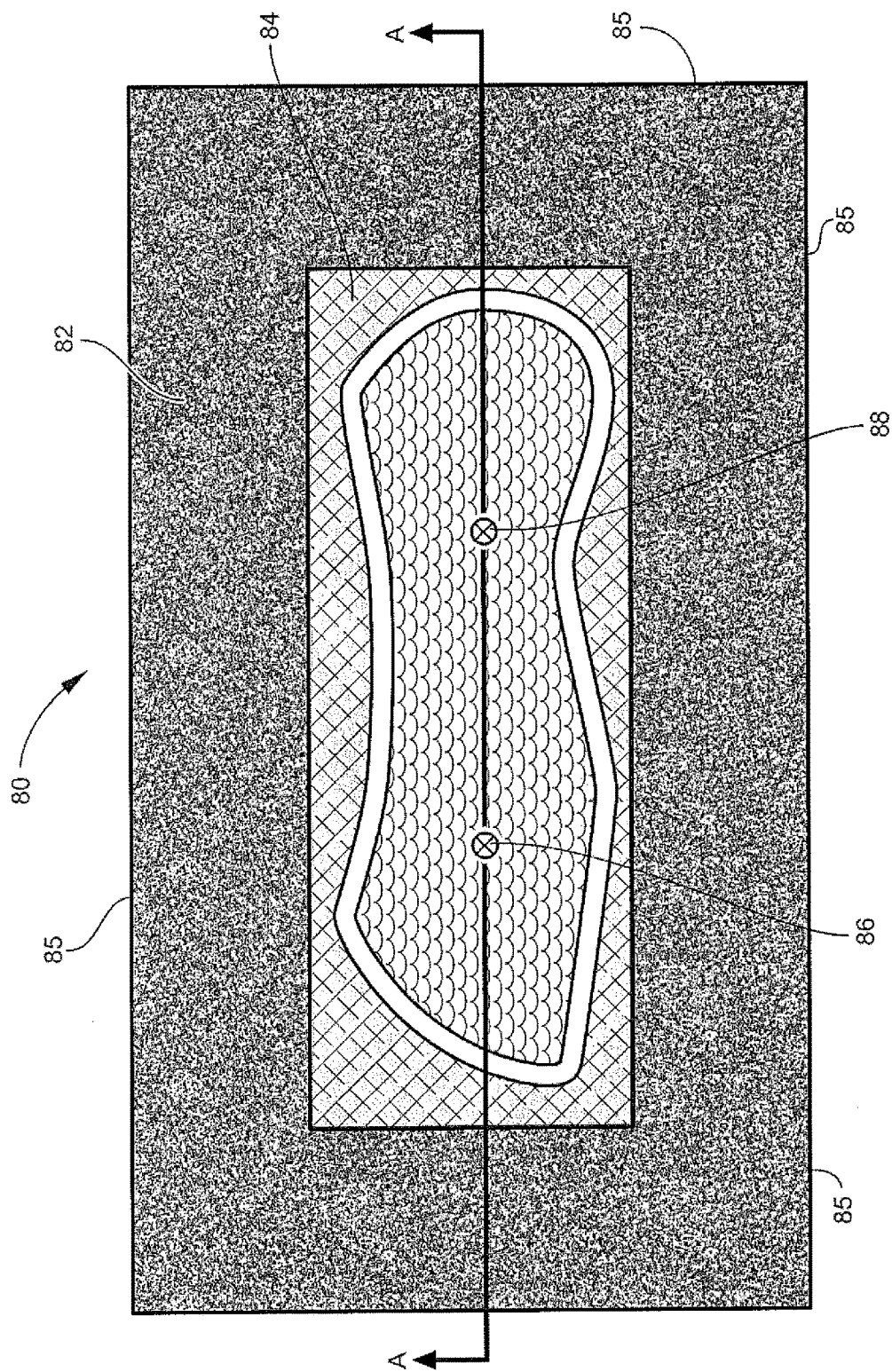
FIG. 5 is a plan view of a raised elevation water storage reservoir according to an embodiment of the invention.
Figure 6:
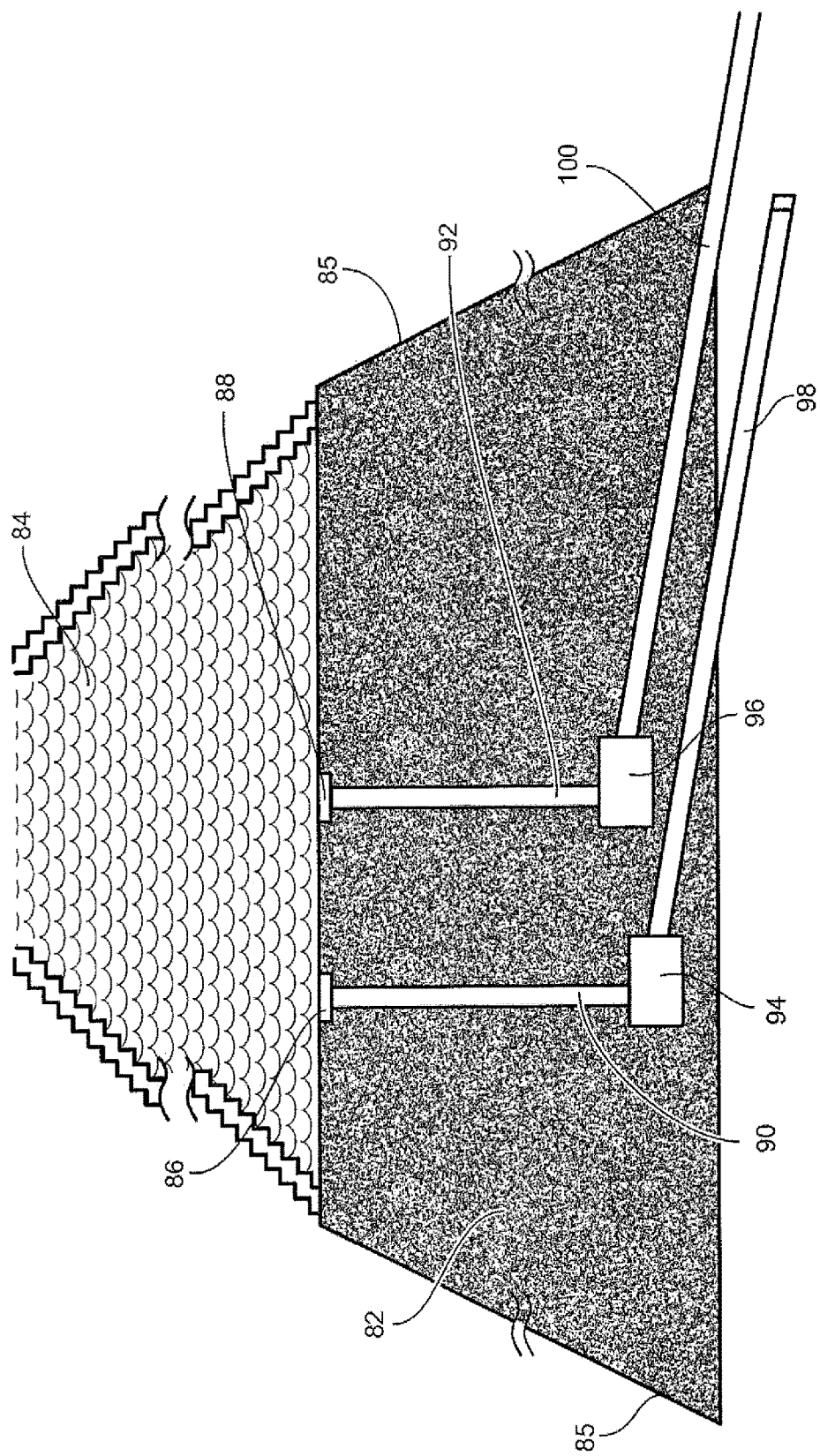
FIG. 6 is a side elevation section of the raised elevation water storage reservoir taken along section lines A-A of FIG. 5.

Referring now to FIGS. 5 and 6, a raised elevation water storage reservoir 80 is shown. The reservoir 80 is formed by first constructing a base 82 of CCR formed to a suitable size with slopping sides according to civil engineering principles with an angle of repose, including margin of error appropriate to the engineering requirements. The CCR may contain additional constituents as required to enhance stability, resistance to environmental factors, and the like. See Table 1. The CCR material maybe covered with a suitable protective barrier, such as soil, vegetation, plastic, textiles or a combination of these or other materials.

A water storage impoundment 84 is constructed on the base 82, having its own angle of repose which may be the same, or different than that of the base 82. The walls 85 of impoundment 84 walls are formed of roller-compacted concrete or strengthened CCR, or multiple layers of each of these materials. While the impoundment 84 maybe filled from the top, either by inflow from rivers, water supply conduits and/or rainfall, the preferable utility is achieved by utilizing the construction as a pump/storage system. As shown in FIG. 6, the impoundment 84 includes drains 86 and 88 that feed conduits 90 and 92, respectively. Variable flow valves, not shown, are provided to allow water to flow out of the impoundment through the drains 86 and 88 through conduits 90 and 92 that feed into hydroelectric pump/generator 94 and 96. Outflow from the impoundment generates electricity that can be used during peak use periods to supplement electricity generated by conventional electric utility generators, such as coal or gas-fired, nuclear or other hydroelectric generators. In low utilization periods, such as at night, excess electricity from these other conventional electric utility generators can be used to powers the pump/generators 94 and 96, which are reversed and pump water into the impoundment through the drains 86 and 88.

Because of the status of CCR as a waste product that is easily shaped and compacted, it can be used to construct bases and similar structures having a wide range of sizes and shapes that can be conformed to size and space requirements of the surrounding land. The relevant strength and density values for the base 82 of FIGS. 5 and 6 are found in Table 1. The CCR constituents and relevant strength and density values for the load-bearing impoundment 84 of FIGS. 5 and 6 are found in Table 2.

Figure 7:
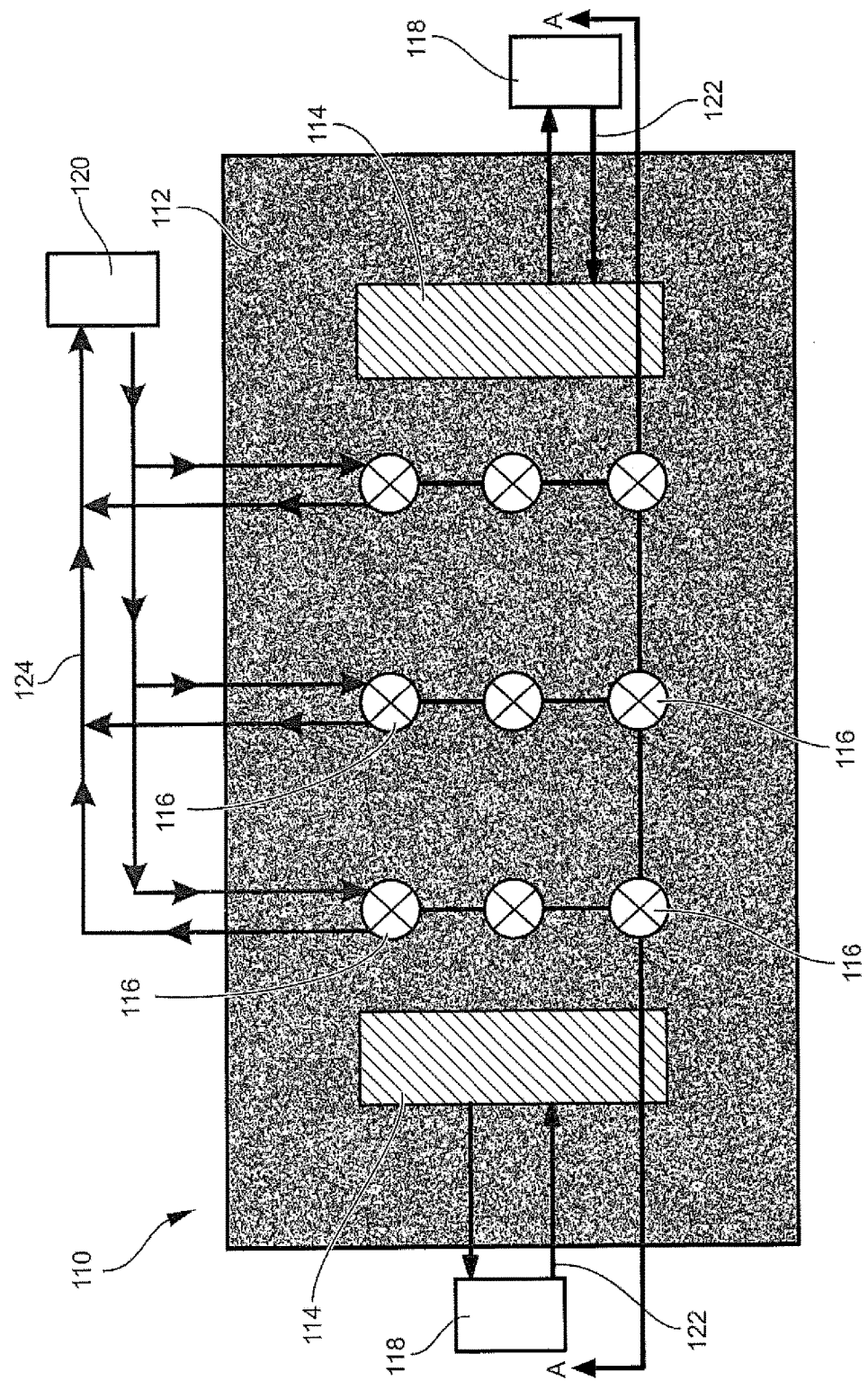
FIG. 7 is a plan view of a horizontal and vertical compressed air storage system according to an embodiment of the invention.
Figure 8:
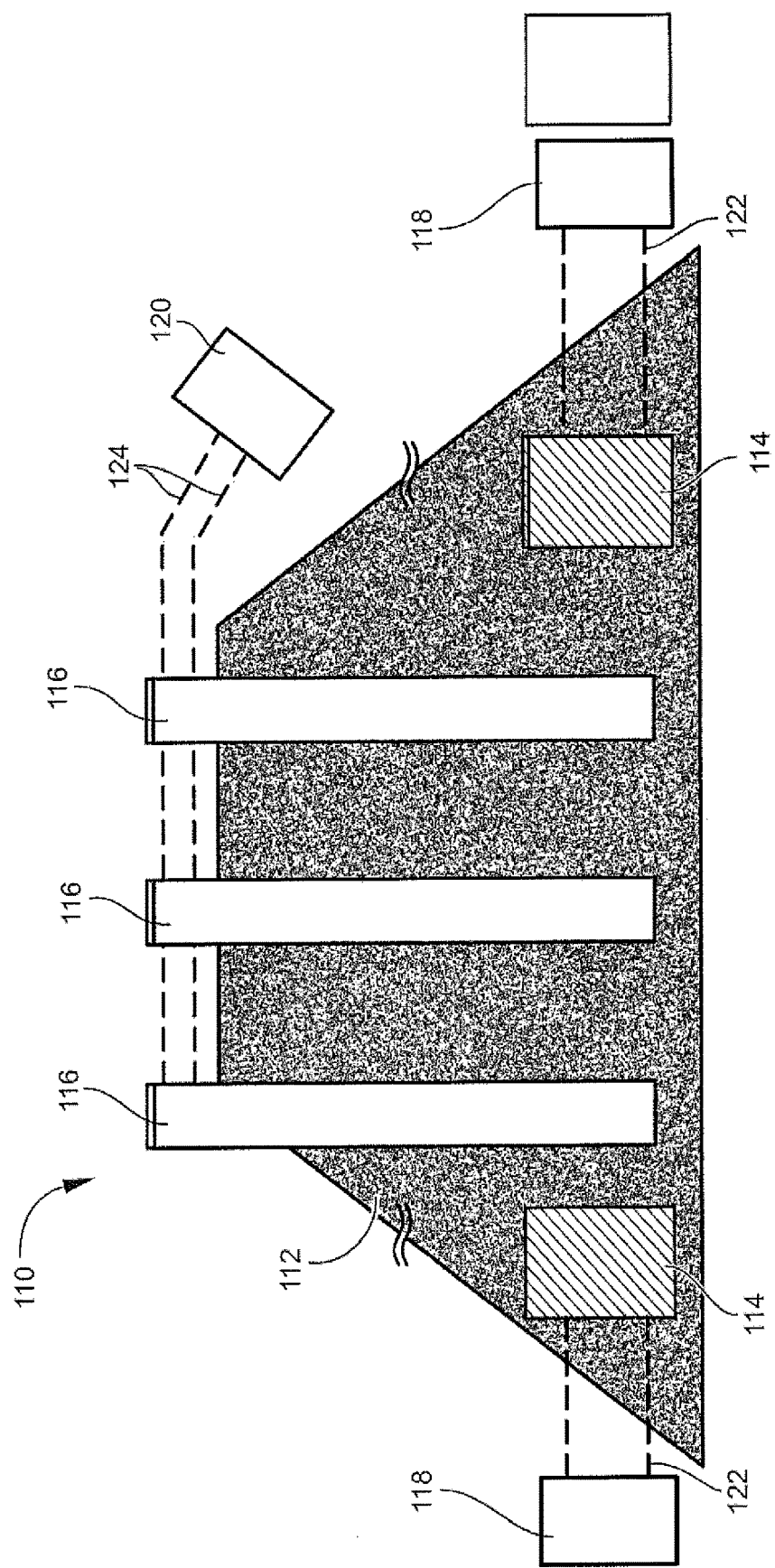
FIG. 8 is a vertical cross-section of a horizontal and vertical compressed air storage system reservoir according to an embodiment of the invention taken along lines A-A of FIG. 7.
Figure 9:
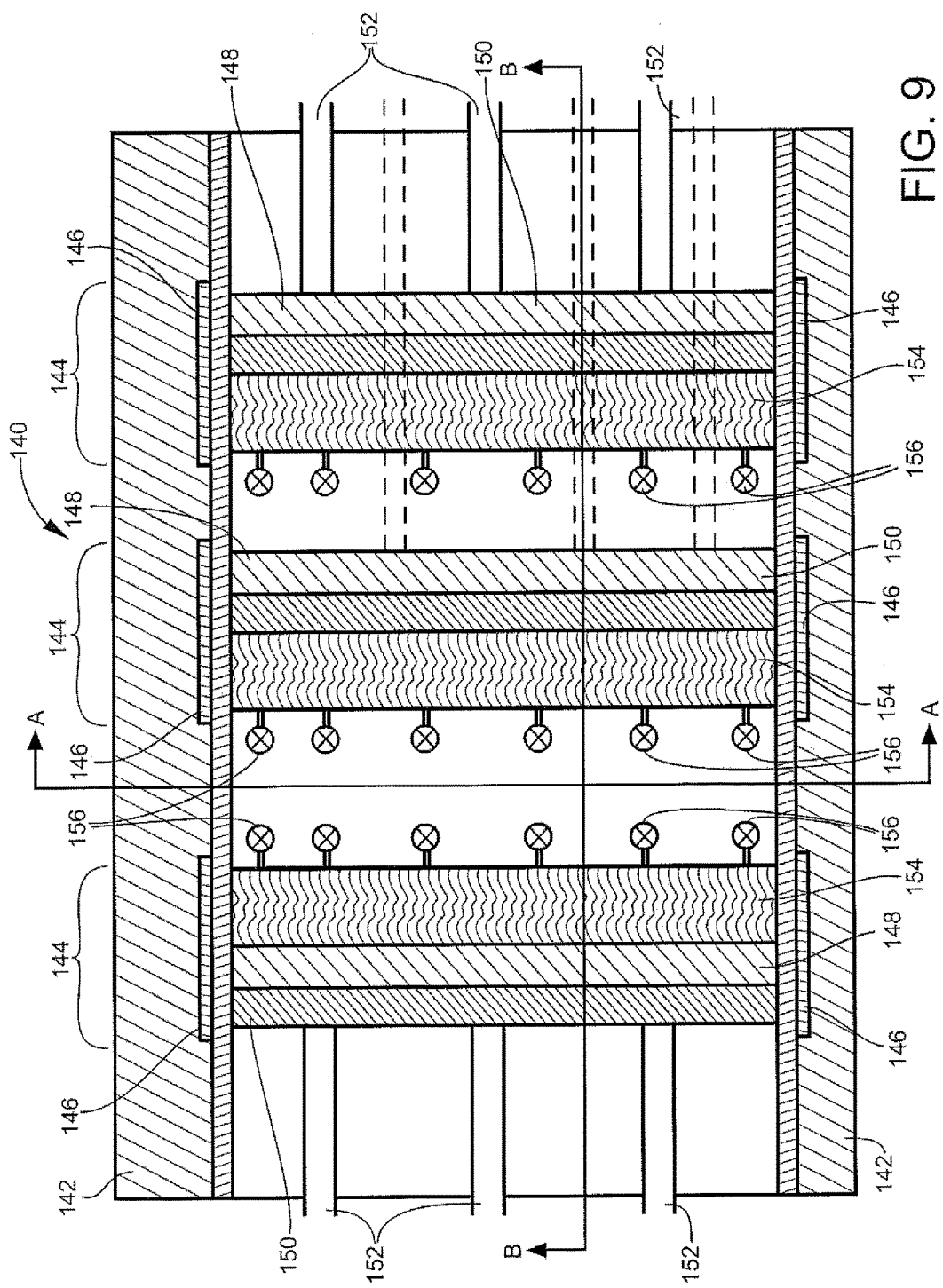
FIG. 9 is a plan view of a carbon sequestration/mineral carbonation facility according to an embodiment of the invention.
Figure 10:
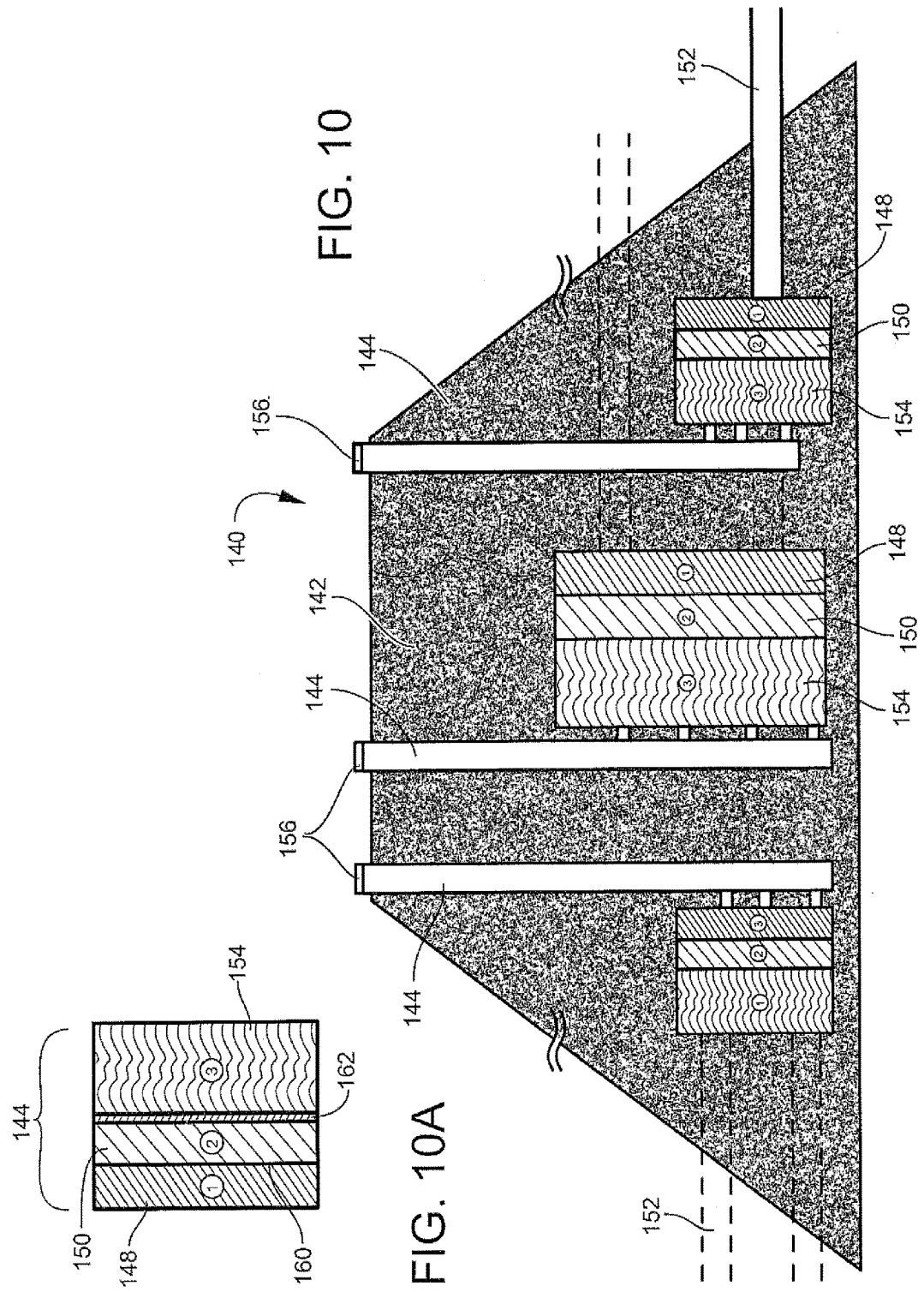
FIG. 10 is a side elevation section of the carbon sequestration/mineral carbonation facility taken along lines B-B of FIG. 9.
Figure 11:
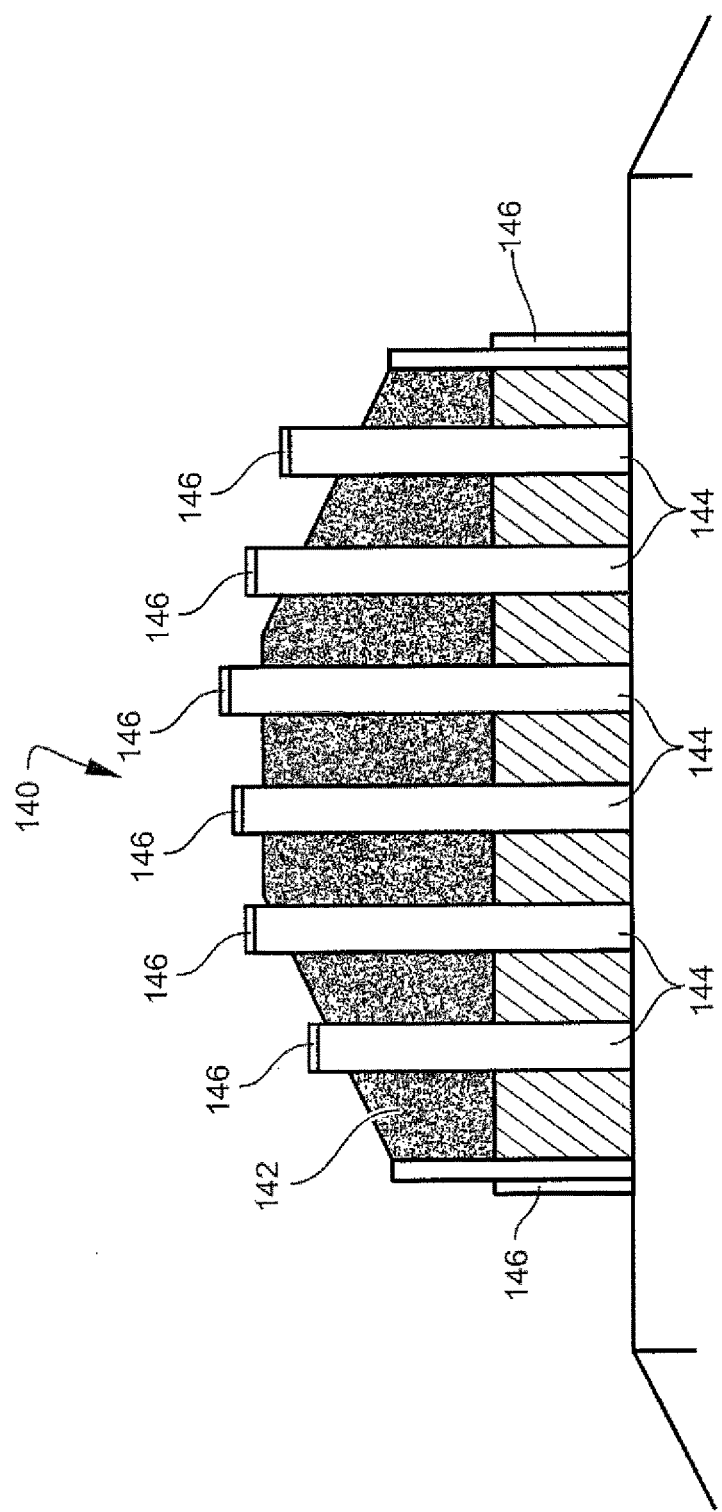
FIG. 11 is a side elevation section of the carbon sequestration/mineral carbonation facility taken along lines A-A of FIG. 9.

Referring to FIGS. 7 and 8, a compressed gas storage system 110 is shown. The storage system 110 is contained in a housing 112 that is constructed of CCR and a mixture of other materials that bind the CCR into a stable, airtight matrix. The materials may include organosilanes according to a formulation that fills the interstices between the CCR particles with material that is stable and does not permit the passage of a gas at or below a specified pressure. For purposes of illustration, the storage system 110 is shown with both horizontal storage containers 114 and vertical storage containers 116, but may be constructed with horizontal, vertical or sloped containers according to space requirements. The gas to be storage in its compressed state may be air, fuel, such as propane, natural gas, or any other gas suitable for storage in a compressed state. Compressors 118 and 120 compress the product to be stored in gaseous form supplied from a source, not shown, and deliver the gas to the horizontal and vertical storage containers 114 and 116 through feed pipes 122, 124, respectively. The feed pipes 122, 124 include valves, not shown, that permit gas to be delivered to specified containers, or all containers, as desired. The compressed gas maybe used for any purpose, including delivery to generators for production of electric power or to turbines connected to any work-producing apparatus.

The CCR constituents and relevant strength and density values for the load-bearing structures of FIGS. 7 and 8 are found in Table 1 of this application.

FIGS. 9, 10, 10A and 11 illustrate a carbon sequestration/mineral carbonation facility 140 constructed of a containment enclosure 142, including a base constructed of strengthened CCR in a mixture with other materials which may include other materials according to a formulation that fills the interstices between the CCR particles with material that is stable and does not permit leakage of the sequestered material from the facility 140. See Table 3. The containment enclosure 142 forms a base that provides stability to the facility and preferably includes walls tapered at an appropriate angle of repose. In the embodiment shown, three sequestration beds 144 are positioned within the enclosure 142 and secured behind airtight doors 146. Each sequestration bed 144 comprises a first filter section 148 of, for example, coarse gravel such as railroad-sized ballast, and a second filter section 150 of, for example, fine stone such as beach sand-sized aggregate.

These filtration sections 148 and 150 provide a progressive filtration effect across a vastly large surface area, removing particulates and gas components of pressurized coal plant emissions that are injected into the containment enclosure 142 through supply conduits 152. The emissions flow from the second filtration section 150 and pass under pressure into sequestration sections 154 that are comprised of fly ash, sorbents and catalysts for enabling carbon-based gases such as carbon monoxide and carbon dioxide to be sequestered over a long period of time.

Filtered gases are vented from the sequestration sections 154 through vents 156. When the sequestration beds 144 are exhausted and require removal and replacement, the doors 146 are removed and the contents of the sequestration beds removed and replaced. The strengthened CCR enables a containment enclosure 142 of indeterminate size to be inexpensively constructed utilizing a waste material to achieve a beneficial effect. The vertical height of the sequestration beds maybe varied as necessary to accommodate the overall height of the containment enclosure 142.

Figure 12:
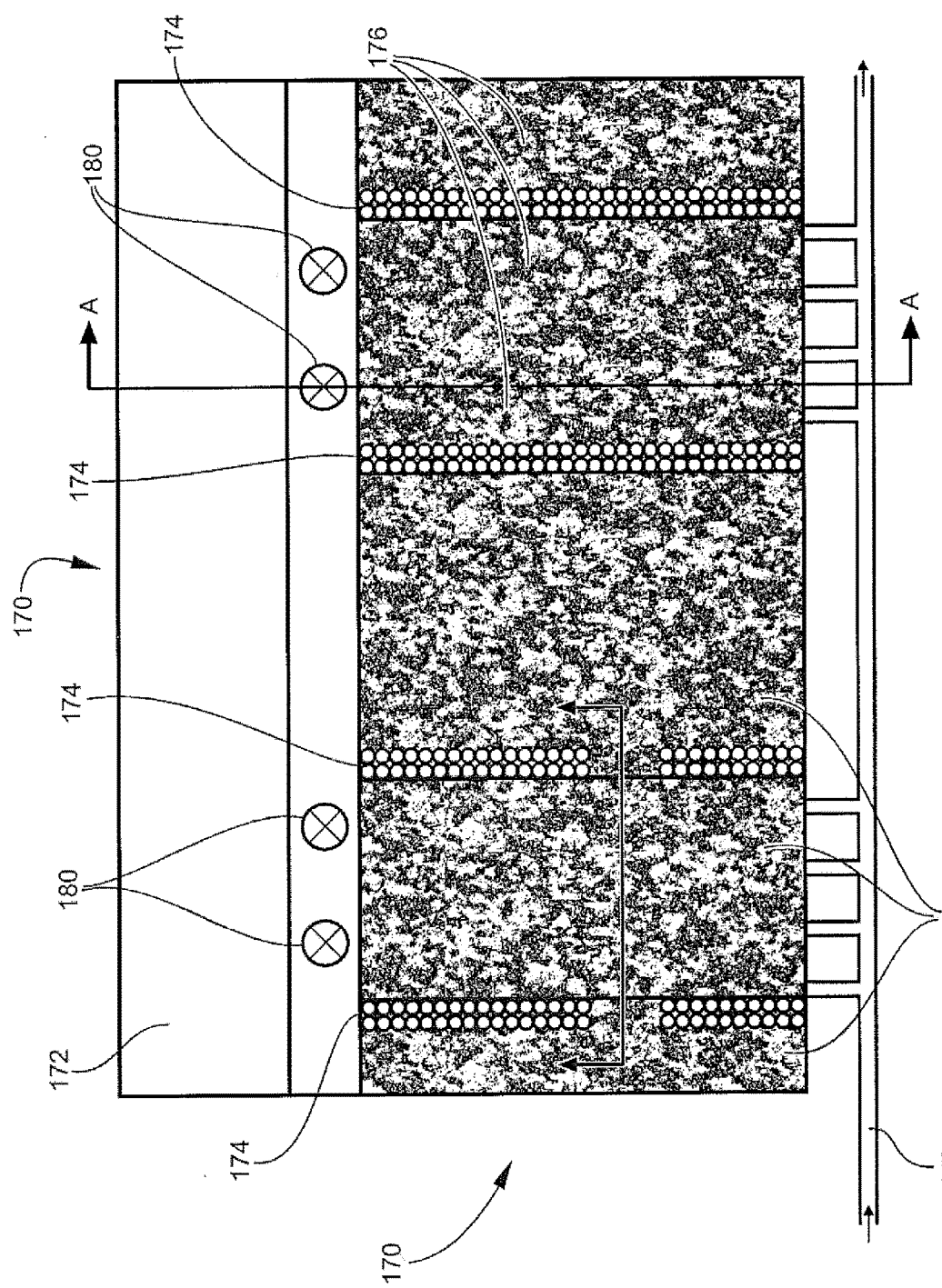
FIG. 12 is a plan view of a carbon capture facility according to an alternative embodiment of the invention.
Figure 13:
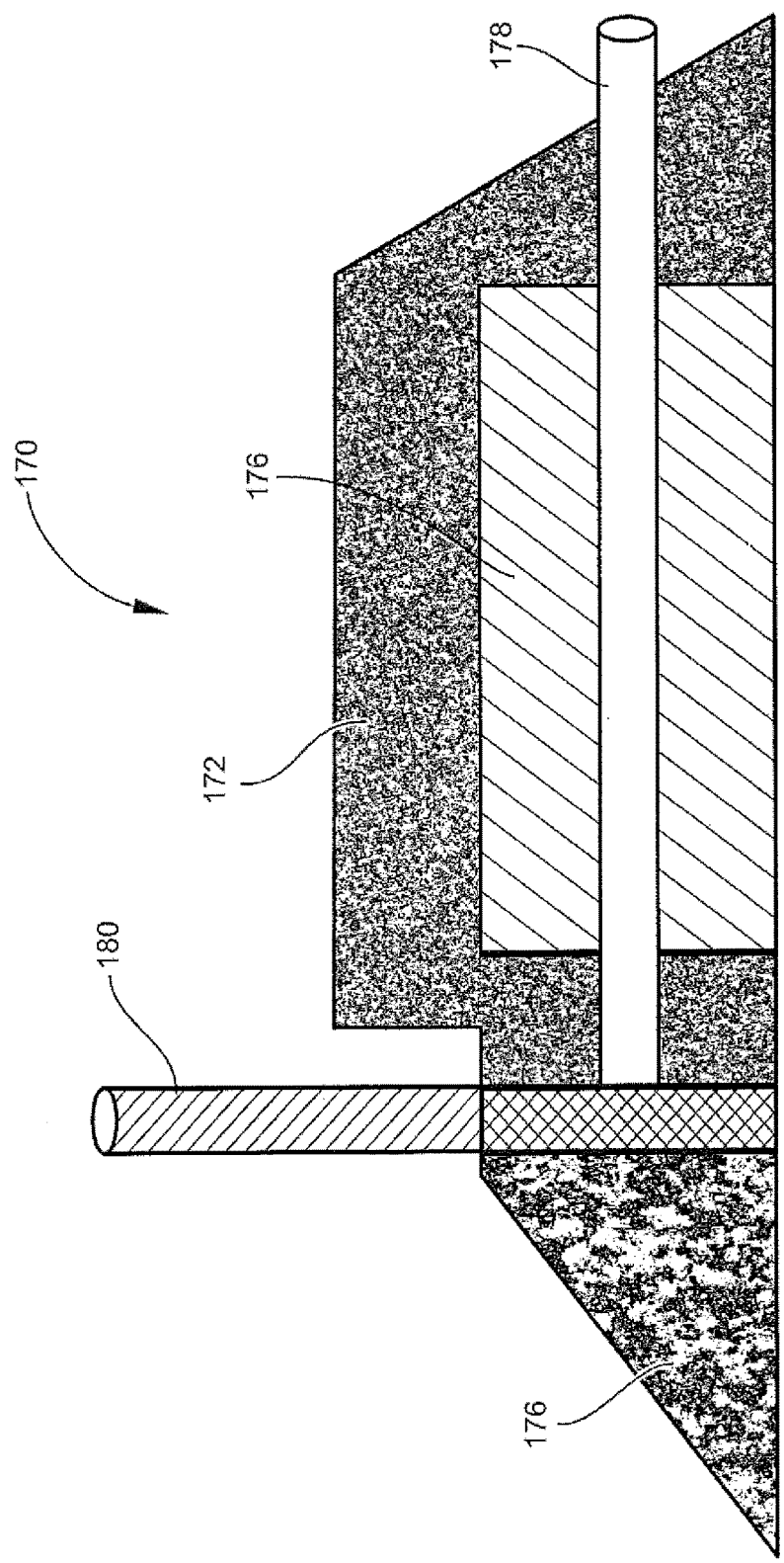
FIG. 13 is a side elevation section of the carbon capture facility taken along lines A-A of FIG. 12.
Figure 14:
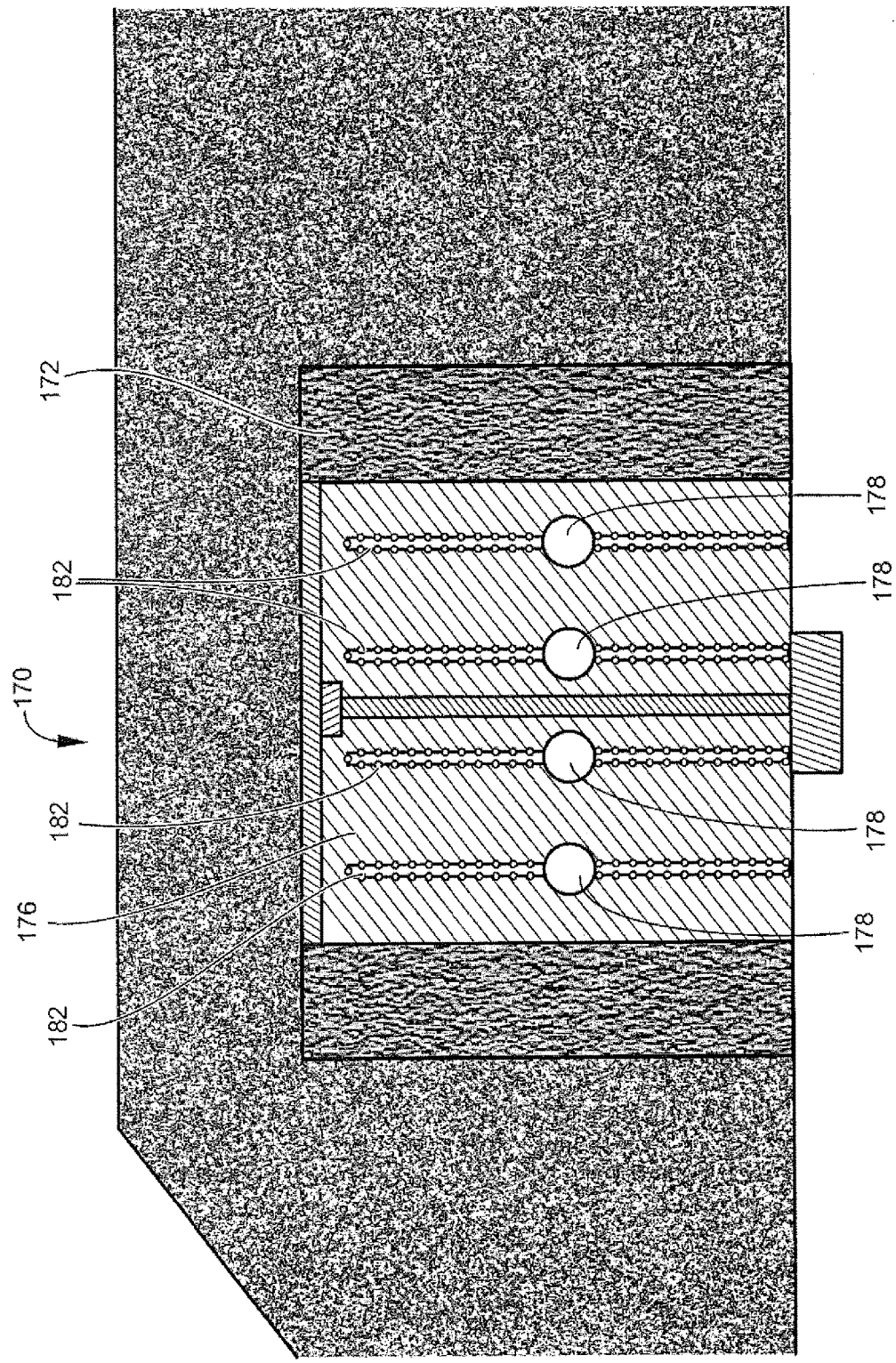
FIG. 14 is a side elevation section of the carbon capture facility taken along lines B-B of FIG. 12.

Another facility 170 for capturing and sequestering carbon-based materials is shown in FIGS. 12, 13 and 14. As with the other embodiments, a containment enclosure 172 is provided that includes a base constructed of strengthened CCR in a mixture with other materials which may include according to a formulation that fills the interstices between the CCR particles with material that is stable and does not permit leakage of the sequestered material from the facility 170. See Table 1. The containment enclosure 172 includes a base that provides stability to the facility and preferably includes walls tapered at an appropriate angle of repose.

The containment enclosure 172 is constructed of strengthened CCR rendered airtight with the addition of a mixture of other materials that bind the CCR into a stable, airtight matrix. The mixture may include materials according to a formulation that fills the interstices between the CCR particles with material that is stable and does not permit the passage of a gas at or below a specified pressure. See Table 1. The enclosure 172 includes spaced-apart arrays of structural components 174 faulted of CCR reinforced with steel or other components. The interior volume of the enclosure 172 is filled with carbon capture materials 176, which may be aggregates of various sizes together with catalyst materials. Carbon-based emissions are conveyed to the enclosure 172 through conduits 178 that feed the emissions under pressure to the carbon capture materials 176 at spaced-apart intervals along its length. Filtered gases suitable for release into the environment are discharged through stacks 180. As shown in FIG. 12, the enclosure 172 is preferably only part of a larger facility. In contrast to the facility 140 of FIGS. 9-11, facility 170 is intended to permanently receive and contain the captured carbon-based materials. When the carbon capture materials 176 have exhausted their ability to sequester more carbon-based materials, the facility 170 is permanently abandoned after removing the stacks 180 and otherwise decommissioning the facility 170. Because of the low cost of the CCR material, abandonment of the facility 170 is cost-effective, and new CCR can be used to construct additional facilities 170 as needed.

As is shown in FIG. 14, emissions conveyed under pressure from an emission-emitting source are passed by the conduits into the carbon capture materials 176 through a multitude of perforated feed pipes 182.

Figure 15:
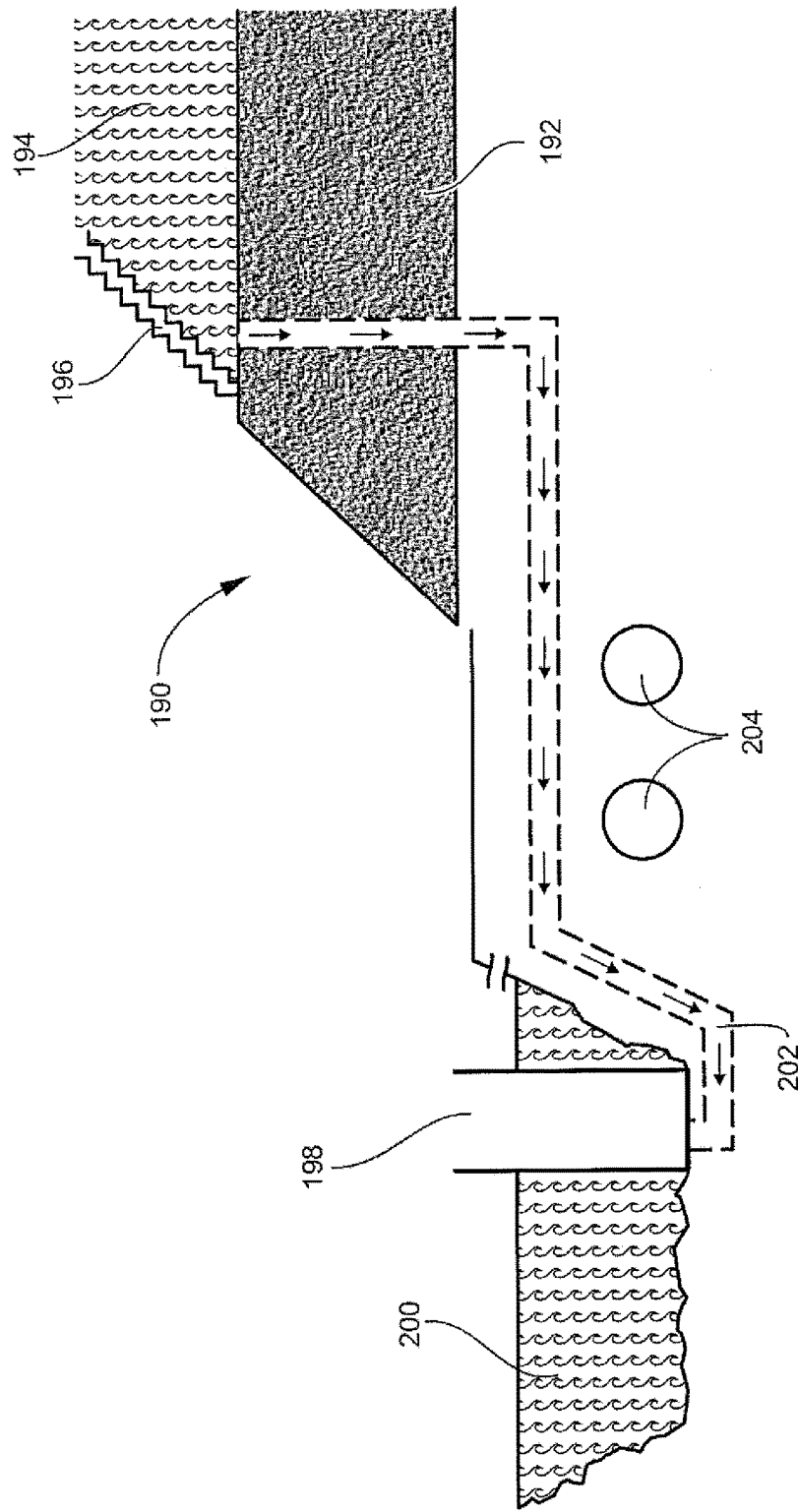
FIG. 15 is a side elevation section of a pumped hydroelectric storage system according to an embodiment of the invention.
Figure 16:
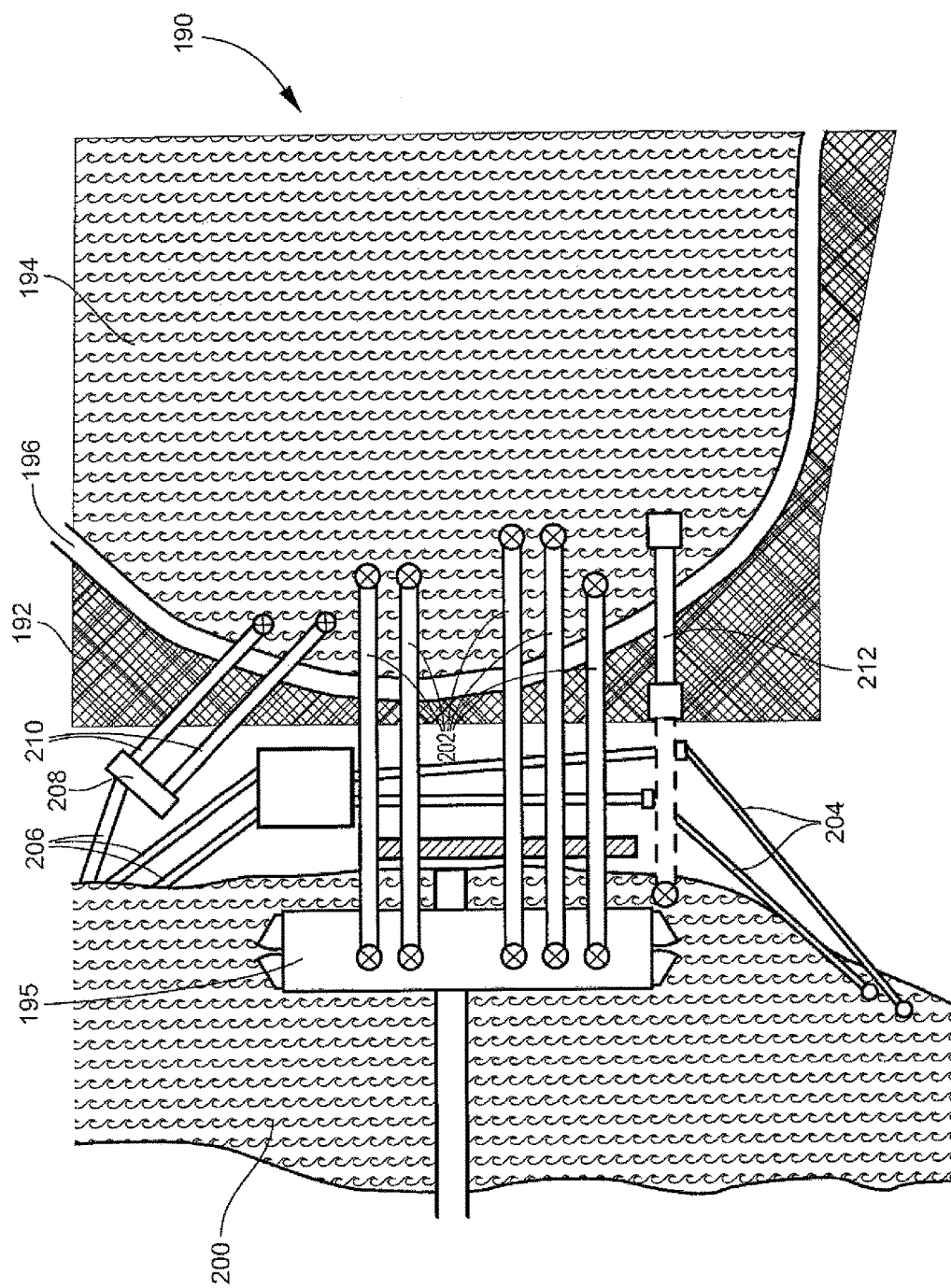
FIG. 16 is a plan view of a pumped hydroelectric storage system according to an embodiment of the invention.

Referring now to FIGS. 15 and 16, a pumped hydroelectric facility 190 is illustrated, and includes a base 192 constructed of strengthened CCR material that may include organosilanes, cement and/or lime according to a formulation that fills the interstices between the CCR particles with material that is stable and does not permit leakage of the sequestered material from the facility 190. The purpose of the base 192 is to raise a water impoundment 194 about the level of a lower water source, such as another reservoir or river, dammed or undammed. The impoundment 194 is formed by reinforced roller-compacted concrete walls 196. Table 2.

Locks and dams located on the major navigable river waterways in the United States are widely known to be in desperate need of repair and or replacement. A large number of coal-fired power plants are located directly adjacent to or nearby these navigable waters. Many of the locks and dams in the United States were built in the 1930s or before, and the original design life of most locks and dams when they were constructed was 50 years. The current and historical lack of infrastructure funding to repair and/or replace these locks and dams, and lack of maintenance and repair causes delays in river traffic in location such as the Ohio River near Pittsburgh, Pa. due to repairs taking place on its locks and dams. Unless these problems are solved, situations of this type will become progressively worse. There is a demand for repair and replacement of existing locks and dams on the nation's river systems, to increase capacity, timeliness and efficiency of cargo traffic that can be solved in large measure by using CCR as a means of cost-effectively maintaining and repairing riverine structures.

As shown in FIGS. 15 and 16, a river lock 198 is shown positioned in a river 200 and is used for passage of vessels in the ordinary manner. In accordance with an embodiment of the invention, a piping system 202 that enables rapid filling of the lock 198 interconnects the impoundment 194 with the lock 198, which includes a run of the river intake/penstock water intake piping structure 204 and a downstream outflow piping structure 206.

As is best shown in FIG. 16, a hydroelectric generator/pump facility 208 that receives water from the intake piping structure 204, generates electricity from movement of the water, and discharges the water back into the river downstream of the facility 208. Bypass outflow pipes 210; permit water to be discharged from the impoundment 194 downstream into the river. This enables the level in the impoundment to be controlled by direct discharge into the river.

When a vessel passes through a lock on, for example, the Mississippi River south of Illinois, it takes approximately 1 hour and 30 minutes to raise the vessel once the lock gates are closed when it is traveling from the downstream side of the lock to the upstream side. With a vessel on the Ohio River, it takes approximately 45 minutes once the lock gates are closed to raise the vessel when traveling from the downstream side of the lock and dam to the upstream side.

FIGS. 15 and 16 demonstrate the use of a CCR such as the base 192 static structure for the rapid filling of river locks to decrease the time it takes a vessel to transit a lock such as lock 198. Water from the impoundment 194 flows into the lock 198 either as the full water supply or together with river water to fill the lock as required. This results in a much more rapid fill rate. Another benefit is the ability for the lock to function during times of low river water when the lock might otherwise be unusable due to lower water flow. Vessels using locks that fill with the traditional method experience higher costs than those using the rapid filling method described due to the longer time it will to navigate the lock. The business model for this new rapid fill system is based on the ability to use very inexpensive CCR as a principal part of construction.

A key ancillary feature is the ability of the impoundment 194 to supply water to power the hydroelectric generator 208 with an intake structure to create the energy to pump water from the river to the water storage facility. As shown in the drawings, water from the impoundment 194 can be discharged through the piping system 202 that interconnects through valves, not shown, with the run of the river intake/penstock water intake piping structure 204 to feed the hydroelectric generator 208 and thereby produce electricity. During periods of low electricity usage, water from upstream of the lock 198, can be taken from the river by the run of the river intake/penstock water intake piping structure 204 and delivered to the generator 208. This water can be used to either generate electricity for the electric grid, or used to power a pump that pumps water from the river through a conduit 212 up into the impoundment 194 for use during peak electricity demand periods.

Thus, energy from off-site renewable sources such as wind and/or solar, the hydroelectric system described above, or conventional coal, or natural gas electrical power sources can be used to pump water into the impoundment for storage until needed for production of power at times as required during peak demand.

The CCR constituents and relevant strength and density values for the load-bearing structures of FIGS. 15 and 16 are found in Tables 2 of this application.

The more flowable mixes should have less cracking and lower permeability. Less compressive strength, lower cement content of a mix in general makes a more "ductile" mix that has less potential for cracking. It will allow the CCR mix to act like a liner and a structural component.

Having these different types of mix designs, brackets, and expands the range of uses and provides flexibility in the design. The CCR mix that would be used on a specific project will be verified by leachability, compressive strength and durability testing during the design phase of each project.

TABLE 1

Load Bearing Wall - CCR Specialty Mix Designs

| Mix Design - Application | Target Compressive Strength (psi) | Density (lb/ft3) | Water Content (lb/yd3) | Cement Content (lb/yd3) | Fly Ash Content (lb/yd3) | Fly Ash to Cement Percent | Sand or Fine Aggregate (lb/yd3) | Course Aggregate (lb/yd3) | Water-Cement/Fly Ash Ratio |
|---|---|---|---|---|---|---|---|---|---|
| Load Bearing - Bottom Ash Aggr | 3,500 | 144.1 | 166 | 135 | 290 | 68.2% | 2100 | 1200 | 0.39 |
| Load Bearing - Standard Mix | 4,000 | 147.0 | 170 | 135 | 135 | 50.0% | 1230 | 2300 | 0.63 |
| Load Bearing - Flowable Mix | 1,200 | 118.9 | 300 | 100 | 300 | 75.0% | 2500 | 10 | 0.75 |

TABLE 2

Encapsulated RCC Dam - CCR Specialty Mix Designs

| Mix Design Application | Target Compressive Strength (psi) | Density (lb/ft3) | Water Content (lb/yd3) | Cement Content (lb/yd3) | FGD or Fly Ash Content (lb/yd3) | Fly Ash to Cement Percent | Bottom Ash Sand or Fine Aggregate (lb/yd3) | Course Aggregate (lb/yd3) | Percentage of Catalyst or Additives | Water-Cement/Fly Ash Ratio |
|---|---|---|---|---|---|---|---|---|---|---|
| USBR Upper Stillwater Dam | 4,000 | 147.0 | 166 | 134 | 291 | 68.5% | 1,148 | 2,231 | 3.0% | 0.39 |
| USBR Upper | 4,000 | 148.4 | 150 | 159 | 349 | 68.7% | 1,171 | 2,178 | 3.0% | 0.30 |

TABLE 2-continued

Encapsulated RCC Dam - CCR Specialty Mix Designs

| Mix Design Application | Target Compressive Strength (psi) | Density (lb/ft3) | Water Content (lb/yd3) | Cement Content (lb/yd3) | FGD or Fly Ash Content (lb/yd3) | Fly Ash to Cement Percent | Bottom Ash Sand or Fine Aggregate (lb/yd3) | Course Aggregate (lb/yd3) | Percentage of Catalyst or Additives | Water-Cement/Fly Ash Ratio |
|---|---|---|---|---|---|---|---|---|---|---|
| Stillwater Dam RCC Dam - High Fly Ash Mix | 3,500 | 144.1 | 166 | 135 | 290 | 68.2% | 2,100 | 1,200 | 3.0% | 0.39 |
| RCC Dam - Standard Mix | 4,000 | 147.0 | 170 | 135 | 135 | 50.0% | 1,230 | 2,300 | 3.0% | 0.63 |
| Load Bearing - Flowable Mix | 1,200 | 118.9 | 300 | 100 | 300 | 75.0% | 2,500 | 10 | 3.0% | 0.75 |

TABLE 3

Encapsulated Mine Reclamation and Carbon Sequestration - CCR Specialty Mix Designs

| Mix Design Application | Target Compressive Strength (psi) | Density (lb/ft3) | Water Content (lb/yd3) | Cement Content (lb/yd3) | FGD or Fly Ash Content (lb/yd3) | Fly Ash to Cement Percent | Bottom Sand or Fine Aggregate (lb/yd3) | Course Aggregate (lb/yd3) | Percentage of Catalyst or Additive | Water-Cement/Fly Ash Ratio |
|---|---|---|---|---|---|---|---|---|---|---|
| PA - OSM Field Office - 1980 to 1997 | Less than 500 psi | 153.0 | 800 | 282 | 1900 | 87.1% | 1,148 | 0 | 3.0% | 0.37 |
| PA - OSM Field Higher Strength Mix | Less than 1,000 psi | 129.5 | 458 | 340 | 1375 | 80.2% | 1,323 | 0 | 3.0% | 0.27 |
| Mine Reclamation Aggregate Mix | 3,000 | 144.5 | 166 | 135 | 300 | 69.0% | 2,100 | 1,200 | 3.0% | 0.38 |
| Mine Reclamation Carbon Capture | 1,200 | 129.6 | 300 | 100 | 400 | 80.0% | 2,500 | 200 | 3.0% | 0.6 |

Note:
1) PA OSM, To be Verified from other sources and
2) Proprietary additives developed by Dr. S. Chen provide encapsulation of carbon and metals.

A number of structures utilizing CCR as a structural component with other components are described above. Various details of the invention maybe changed without departing from its scope. Furthermore, the foregoing description of the preferred embodiments of the invention and the best mode for practicing the invention are provided for the purpose of illustration only and not for the purpose of limitation.

We claim:

1. A beneficial use structure comprising coal combustion residuals ("CCR") mixed with water and a binder to form a structural material, and adapted to be compacted for use in a formation of the beneficial use structure, wherein the structural material is adapted for use as a load-bearing wall, and is comprised of between approximately 25 and 50 percent CCR, 25 and 50 percent water and 25 and 14 percent cement, and further wherein the beneficial use structure is a survival bunker, comprising:
   a. an interior volume defined by sloped sidewalls and a planar top that together define a truncated pyramid structure, and having blast-deflecting characteristics defined by a solid volume thickness of the sloped sidewalls and planar top;
   b. the solid volume thickness of the bunker comprising a coal combustion residue ("CCR")-based material;
   c. a base on which the sloped sidewalls and planar top are constructed;
   d. a plurality of survival living areas in the interior volume of the bunker and reached by respective entrance/exit tunnels formed through the CCR-based material;
   e. air intake and exhaust plenums extending between the survival living areas and outside the bunker to maintain appropriate oxygen levels in the bunker; and
   f. at least one multi-fuel generator for providing electric current to the survival living areas, including at least one fuel supply facility for supplying fuel to the generator.

2. A beneficial use structure according to claim 1, and including a water storage stepwell defined by a vertical shaft within an area defined by the bunker and adapted to accumulate water from any source for use by bunker occupants, the planar top of the bunker being sloped towards the stepwell to promote drainage of water accumulating on the top of the bunker, the stepwell including an array of narrow steps along one side of the stepwell that permit entry into the stepwell and allow access to the entire stepwell.

3. A beneficial use structure according to claim 2, wherein the stepwell includes a drain at a bottom of the stepwell that is adapted to deliver water under gravitational pressure a generator to generate electricity.

4. A beneficial use structure according to claim 1, wherein the CCR is a material selected from the group of materials consisting of roller compacted CCR, poured-in-place concrete or a composite of roller compacted CCR and concrete.

5. A beneficial use structure according to claim 1, and including a waterproof entrance/exit from the living areas to the stepwell.

6. A beneficial use structure according to claim 1, wherein the stepwell includes an overflow drain.

7. A beneficial use structure according to claim 1, wherein the stepwell includes an outlet drain adapted to allow water in the stepwell to flow out of the bottom of the stepwell through an outflow conduit into a turbine generator for generating electricity.

8. A beneficial use structure comprising coal combustion residuals ("CCR") mixed with water and a binder to form a structural material, and adapted to be compacted for use in the formation of the beneficial use structure, wherein the structural material is adapted for use as a load-bearing wall, and is comprised of between approximately 29 and 78 percent CCR, and further wherein the beneficial use structure is a survival bunker, comprising:
  a. an interior volume defined by sloped sidewalls and a planar top that together define a truncated pyramid structure, and having blast-deflecting characteristics defined by a solid volume thickness of the sloped sidewalls and planar top;
  b. the solid volume thickness of the bunker comprising a coal combustion residue ("CCR")-based material;
  c. a base on which the sloped sidewalls and planar top are constructed;
  d. a plurality of survival living areas in the interior volume of the bunker and reached by respective entrance/exit tunnels formed through the CCR-based material;
  e. air intake and exhaust plenums extending between the survival living areas and outside the bunker to maintain appropriate oxygen levels in the bunker; and
  f. at least one multi-fuel generator for providing electric current to the survival living areas, including at least one fuel supply facility for supplying fuel to the generator.

* * * * *